United States Patent
Mori et al.

(10) Patent No.: US 9,954,472 B2
(45) Date of Patent: Apr. 24, 2018

(54) CONTROL APPARATUS FOR AC ROTARY MACHINE

(71) Applicant: Mitsubishi Electric Corporation, Tokyo (JP)

(72) Inventors: Tatsuya Mori, Tokyo (JP); Akira Furukawa, Tokyo (JP); Yoshihiko Kimpara, Tokyo (JP); Isao Kezobo, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 99 days.

(21) Appl. No.: 14/916,799

(22) PCT Filed: Nov. 8, 2013

(86) PCT No.: PCT/JP2013/080235
§ 371 (c)(1),
(2) Date: Mar. 4, 2016

(87) PCT Pub. No.: WO2015/068258
PCT Pub. Date: May 14, 2015

(65) Prior Publication Data
US 2016/0204726 A1 Jul. 14, 2016

(51) Int. Cl.
H02P 21/14 (2016.01)
H02P 21/22 (2016.01)

(52) U.S. Cl.
CPC .............. *H02P 21/14* (2013.01); *H02P 21/22* (2016.02)

(58) Field of Classification Search
CPC .................................. H02P 21/14; H02P 21/22
(Continued)

(56) References Cited

U.S. PATENT DOCUMENTS 6,194,865 B1 * 2/2001 Mitsui ................... B60L 15/025
                                                        318/139
6,936,991 B2 * 8/2005 Chen ........................ B60K 6/26
                                                        318/700
(Continued)

FOREIGN PATENT DOCUMENTS

CN    102916643 A    2/2013
DE    41 05 868 A1   9/1991
(Continued)

OTHER PUBLICATIONS

International Search Report for PCT/JP2013/080235 dated Jan. 21, 2014 [PCT/ISA/210].
(Continued)

*Primary Examiner* — Bentsu Ro
*Assistant Examiner* — Devon Joseph
(74) *Attorney, Agent, or Firm* — Sughrue Mion, PLLC; Richard C. Turner

(57) ABSTRACT

A control apparatus for an AC rotary machine includes a current detection unit that detects a current of a first winding and a current of a second winding, a basic voltage calculation unit that calculates a basic voltage on the basis of a current command value, a first voltage calculation unit that calculates a voltage command value of the first winding on the basis of the current command value, the basic voltage, and the current of the first winding, and a second voltage calculation unit that calculates a voltage command value of the second winding on the basis of the current command value, the basic voltage, and the current of the second winding. At least the first voltage calculation unit calculates the voltage command value of the first winding by further taking into account the current of the second winding.

17 Claims, 17 Drawing Sheets

(58) Field of Classification Search
USPC .................................................. 318/400.02
See application file for complete search history.

(56) References Cited

U.S. PATENT DOCUMENTS

| | | | | |
|---|---|---|---|---|
| 7,800,337 | B2* | 9/2010 | Kinpara | H02P 21/16 318/712 |
| 8,294,395 | B2* | 10/2012 | Kimpara | H02P 21/0003 318/400.02 |
| 8,686,672 | B2* | 4/2014 | Suzuki | B62D 5/046 318/400.02 |
| 9,350,282 | B2* | 5/2016 | Kato | H02P 6/06 |
| 2002/0005704 | A1* | 1/2002 | Yoshikawa | H02M 7/493 318/727 |
| 2003/0085683 | A1* | 5/2003 | Satake | H02P 9/007 318/727 |
| 2010/0066283 | A1 | 3/2010 | Kitanaka | |
| 2013/0033210 | A1 | 2/2013 | Suzuki et al. | |
| 2016/0190972 | A1* | 6/2016 | Mori | H02M 7/53873 318/490 |
| 2016/0329850 | A1* | 11/2016 | Mori | H02P 21/22 |
| 2016/0373050 | A1* | 12/2016 | Mori | H02P 27/08 |
| 2017/0201200 | A1* | 7/2017 | Hachiya | H02P 21/18 |

FOREIGN PATENT DOCUMENTS

| | | |
|---|---|---|
| JP | 2614788 B | 2/1997 |
| JP | 11-262293 A | 9/1999 |
| JP | 2003-153585 A | 5/2003 |
| WO | 2008/047438 A1 | 4/2008 |

OTHER PUBLICATIONS

Written Opinion for PCT/JP2013/080235 dated Jan. 21, 2014 [PCT/ISA/237].
Communication dated Aug. 3, 2017, from the State Intellectual Property Office of the P.R.C., in counterpart Chinese application No. 201380080780.9, 14 pages with translation.
Communication dated Jul. 13, 2017, from the European Patent Office in counterpart European application No. 13896960.5.

* cited by examiner

CONTROL APPARATUS FOR AC ROTARY MACHINE

CROSS REFERENCE TO RELATED APPLICATIONS

This application is a National Stage of International Application No. PCT/JP2013/080235 filed Nov. 8, 2013, the contents of all of which are incorporated herein by reference in their entirety.

TECHNICAL FIELD

This invention relates to a control apparatus for an AC rotary machine having at least a first winding and a second winding.

BACKGROUND ART

In an AC rotary machine having a plurality of windings, a plurality of current control systems interfere with each other due to mutual inductance between the plurality of windings, and therefore a current and a voltage are likely to become oscillatory, making it more difficult to widen a response band of the control systems than when a single system is used. Several methods have been proposed in response to this problem.

In one of these methods, employed in a conventional control apparatus for an AC rotary machine, a feedback signal transmitted from a plurality of inverters connected in parallel to a multiphase AC motor to a representative current control system provided on a rotary coordinate system of the AC motor is set at an average value of output currents from the respective inverters. Further, a feedback signal transmitted to an imbalance suppressing current control system provided on the rotary coordinate system of the AC motor is set at a differential value of the output currents from the respective inverters.

As a result, the imbalance suppressing current control system acts to equalize the output currents from the respective inverters, and therefore respective currents of windings of respective phases in the multiphase AC motor can be balanced.

Further, an unbalanced current can be reduced in a similar manner by the action of the current control system likewise in inverters that are connected in parallel using an external reactor.

By balancing the output currents of the respective inverters in this manner, the external reactor can be reduced in size or omitted, and control exhibiting high responsiveness can be realized (PTL 1, for example).

Furthermore, in a conventional control apparatus for an AC rotary machine, a non-interference voltage calculation unit is provided for each of respective control circuits of inverters INV1 to INVN that drive respective windings of a three-phase, N-layer winding motor, and an excitation command value $I_O^*$, a torque command value $I_T^*$, d, q axis current command values $i_1d^*$, $i_1q^*$ obtained by dividing $I_O^*$ and $I_T^*$ by a number N of turns in the multiplex winding, and a primary side frequency $\omega$ are taken therein. d, q axis voltage set values $v_1d^*$, $v_1q^*$ are then calculated from these values, whereupon non-interference control of the three-phase multiplex winding motor is realized by performing vector control (PTL 2, for example).

CITATION LIST

Patent Literature

[PTL 1]
  Japanese Patent No. 2614788
[PTL 2]
  Japanese Patent Application Publication No. H11-262293

SUMMARY OF INVENTION

Technical Problem

However, the following problems occur in the prior art.

In PTL 1, a large number of complicated operations must be performed in the representative current control system and the imbalance suppressing current control system using the currents of both the first and second windings. Moreover, during non-interference control based on detected currents such as the currents of the first and second windings, the effects of interference cannot be eliminated completely due to time wastage between detection of the first and second winding currents and implementation of the operations of the representative current control system and the imbalance suppressing current control system such that a voltage is applied to the plurality of inverters.

It is therefore difficult to realize an equal current response to that of a conventional single system winding, and this difficulty is particularly evident when using a low-cost microcomputer having a low operation speed.

In PTL 2, the non-interference voltage calculation unit is provided for each of the respective control circuits of the inverters INV1 to INVN in order to improve the feedforward response. This configuration includes a power supply frequency $\omega$ of the AC rotary machine, as indicated by Equation (1) in PTL 2, and therefore a large number of complicated operations are required. The response achieved as a result, however, is merely of an equivalent level to the response of a conventional single system winding, and moreover, a feedback gain cannot be increased sufficiently. Hence, an ability to suppress a disturbance voltage generated as a result of rapid variation in the speed of a three-phase, duplex winding motor, for example, is poor.

An object of this invention is therefore to obtain a control apparatus for an AC rotary machine that includes at least a first winding and a second winding and performs control operations on two rotary axes, with which a reduction in a number of operations, an improvement in response, and an improvement in an ability to suppress disturbances are achieved.

Solution to Problem

To solve the problems described above, a control apparatus for an AC rotary machine according to this invention is a control apparatus for an AC rotary machine that includes a first winding and a second winding and performs control operations on two rotary axes, having: a current detection unit that detects a current of the first winding and a current of the second winding, respectively; a basic voltage calculation unit that calculates a basic voltage on the basis of a current command value and an electric constant of the AC rotary machine; a first voltage calculation unit that calculates a voltage command value of the first winding on the basis of the current command value, the basic voltage, and the current of the first winding; a second voltage calculation unit that calculates a voltage command value of the second winding on the basis of the current command value, the basic voltage, and the current of the second winding; a first voltage application unit that applies a voltage to the first winding of the AC rotary machine on the basis of the voltage command value of the first winding; and a second voltage application unit that applies a voltage to the second winding of the AC rotary machine on the basis of the voltage command value of the second winding, wherein the first voltage calculation unit calculates the voltage command value of the first winding on the basis of the current command value, the basic voltage, the current of the first winding, and also the current of the second winding.

Advantageous Effects of Invention

In the control apparatus for an AC rotary machine according to this invention, the first voltage calculation unit calculates the voltage command value of the first winding on the basis of the current of the first winding, the basic voltage, and the current command value. The second voltage calculation unit calculates the voltage command value of the second winding on the basis of the current of the second winding, the basic voltage, and the current command value. In this case, at least the first voltage calculation unit calculates the voltage command value of the first winding by further taking into account the current of the second winding.

Therefore, during feedback control based on the detected values of the respective currents of the first and second windings according to this invention, there is no need to generate voltage command values for the first and second windings using the currents of both the first and second windings, as in PTL 1. In other words, the voltage command value of the first winding can be calculated by at least the first voltage calculation unit alone on the basis of the current of the other winding, i.e. the second winding. Interference is interactive, but even with this simple configuration, interference between the respective current control systems can be suppressed simply by taking measures in relation to the first voltage calculation unit. As a result, a response at least at a level close to that of a conventional AC rotary machine can be realized.

Moreover, there is no need for a configuration in which a non-interference voltage calculation unit is provided for each of the respective control circuits of INV1 to INVN and the power supply frequency ω of the AC rotary machine is included, and as a result, there is no need to perform a large number of complicated operations.

Furthermore, in this invention, a single basic voltage may be calculated in relation to at least the response of the sum of the currents of the first and second windings on the basis of the current command value and the electric constant. Therefore, in a high frequency band, the current response can be improved using nothing more than the basic voltage that takes into account only an electric constant such as the inductance and winding resistance of the rotary machine. As a result, a response at least at a level close to that of a conventional single system winding can be realized.

As described above, an effect of suppressing interference between the plurality of current control systems, an effect of improving the current response to the current command value, an effect of being able to output a voltage command value that corresponds to the current command value even in a high frequency band, and an effect of being able to realize a higher level of response that that of a conventional single system winding even in a multiplex winding using the action of the current response to the current command value are obtained. Moreover, the current response can be improved by means of non-interference likewise in relation to feedback, and therefore a disturbance suppression ability can also be secured.

Furthermore, in this invention, the number of operations performed during both feedforward and feedback may be increased. For example, a second voltage calculation unit that calculates a voltage command value on the basis of the current of the first winding and so on may be provided in addition to the power supply frequency item and the current of the second winding. In this case, the ability to suppress a disturbance voltage and the current response to the current command value are improved even further.

Hence, according to this invention, the number of operations is reduced in comparison with the prior art even in a multiplex winding, and as a result, a dramatic improvement in response that does not occur in the prior art is obtained.

DESCRIPTION OF EMBODIMENTS

Various embodiments of a control apparatus for an AC rotary machine according to this invention will be described below with reference to the drawings.

First Embodiment

Figure 1:
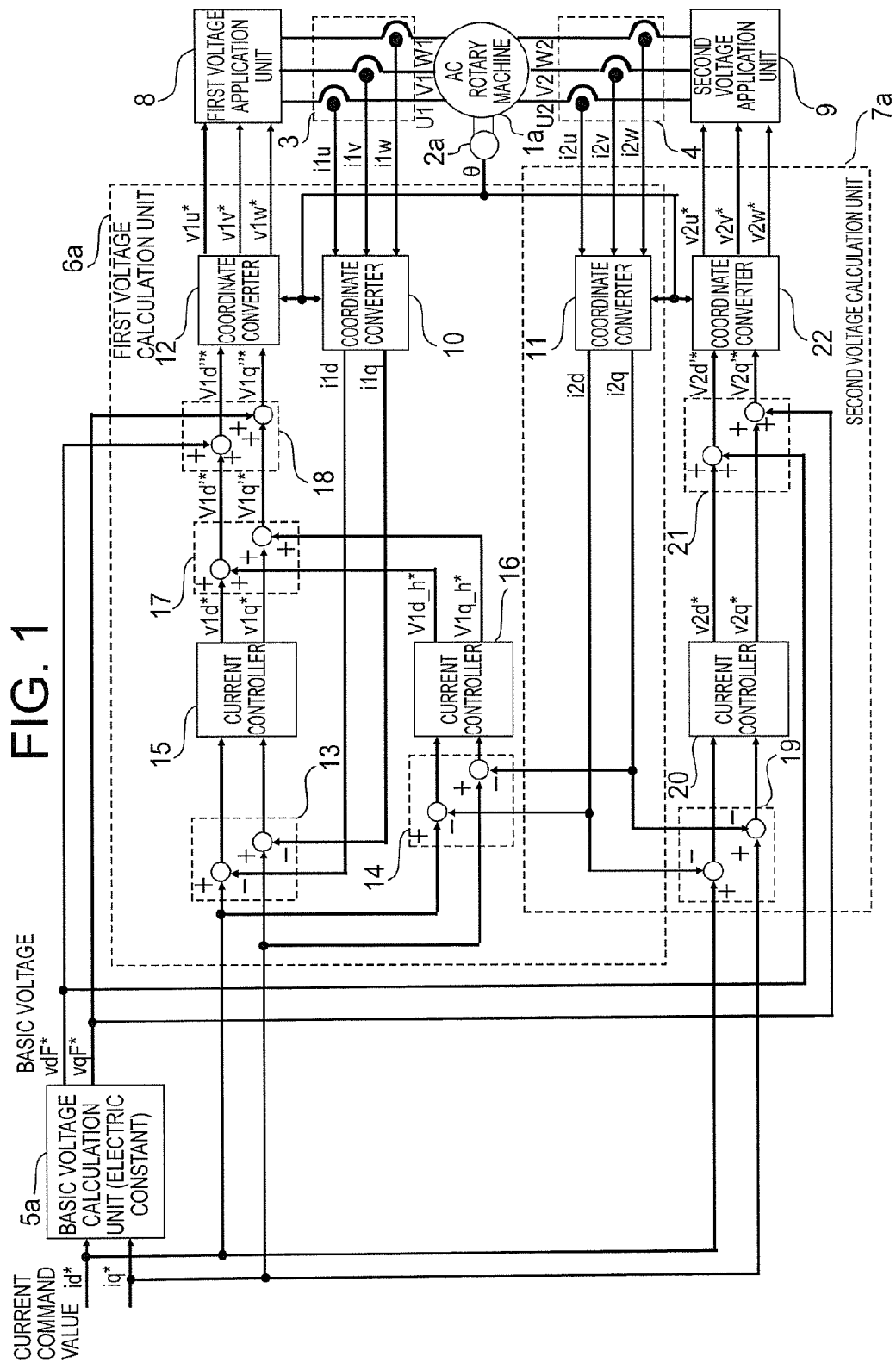
FIG. 1 is a circuit block diagram showing a first embodiment of a control apparatus for an AC rotary machine according to this invention.

FIG. 1 shows an overall configuration of a first embodiment of the control apparatus for an AC rotary machine according to this invention. In the drawing, an AC rotary machine 1a includes two three-phase windings constituted by first windings U1, V1, W1 and second windings U2, V2, W2 (see FIG. 2). Note that in all of the following embodiments, a permanent magnet type synchronous rotary machine having two windings will be described as the AC rotary machine 1a, but this invention may be applied similarly to any permanent magnet type synchronous rotary machine or field winding type synchronous rotary machine having two or more windings.

A position detection unit 2a is constituted by a Hall element, a resolver, an encoder, or the like that detects a rotation position θ of the AC rotary machine 1a. A technique of estimating the position on the basis of a current of the first winding and a current of the second winding, which are detected by current detection units 3, 4 to be described below, may be used instead.

The current detection unit 3 is constituted by a shunt resistor, a Hall element, or the like that detects currents i1u, i1v, i1w passing respectively through the first windings U1, V1, W1 of the AC rotary machine 1a. The current detection unit 4 is constituted by a shunt resistor, a Hall element, or the like that detects currents i2u, i2v, i2w passing respectively through the second windings U2, V2, W2 of the AC rotary machine 1a.

A basic voltage calculation unit 5a calculates basic voltages vdF*, vqF* on two rotary axes (d-q axes) on the basis of current command values id*, iq* issued to the AC rotary machine 1a from the outside and an electric constant stored internally in the AC rotary machine 1a.

A first voltage calculation unit 6a calculates voltage command values v1u*, v1v*, v1w* of the first windings on the basis of the current command values id*, iq*, the currents i1u, i1v, i1w of the first windings, detected by the current detection unit 3, the currents i2u, i2v, i2w of the second windings, detected by the current detection unit 4, and the basic voltages vdF*, vqF*.

A second voltage calculation unit 7a calculates voltage command values v2u*, v2v*, v2w* of the second windings on the basis of the current command values id*, iq*, the currents i2u, i2v, i2w of the second windings, detected by the current detection unit 4, and the basic voltages vdF*, vqF*.

A first voltage application unit 8 is a power converter such as an inverter or a matrix converter that applies the voltage command values v1u*, v1v*, v1w* of the first windings to the first windings U1, V1, W1 of the AC rotary machine 1a by performing modulation processing on the voltage command values v1u*, v1v*, v1w* using an existing technique such as PWM or PAM.

A second voltage application unit 9 is a power converter such as an inverter or a matrix converter that applies the voltage command values v2u*, v2v*, v2w* of the second windings to the second windings U2, V2, W2 of the AC rotary machine 1a by performing modulation processing on the voltage command values v1u*, v1v*, v1w* using an existing technique such as PWM or PAM.

The first voltage calculation unit 6a includes coordinate converters 10, 11, 12, subtractors 13, 14, current controllers 15, 16, and adders 17, 18. The second voltage calculation unit 7a includes coordinate converters 11, 22, a subtractor 19, a current controller 20, and an adder 21. The coordinate converter 11 is shared with the first voltage calculation unit 6a.

The coordinate converter 10 calculates currents i1d, i1q on the two rotary axes (the d-q axes) on the basis of the currents i1u, i1v, i1w detected by the current detection unit 3 and the rotation position θ detected by the position detection unit 2a.

The subtractor 13 subtracts the current command values id*, iq* respectively from the currents i1d, i1q obtained by the coordinate converter 10, and outputs resulting deviations di1d (=id*−i1d), di1q (=iq*−i1q).

The current controller 15 calculates voltage command values v1d*, v1q* on the two rotary axes (the d-q axes) by performing proportional integral (PI) control such that di1d (=id*−i1d) and di1q (=iq*−i1q), obtained from the subtractor 13, align with each other at zero, or in other words become equal to each other.

The coordinate converter 11 calculates currents i2d, i2q on the two rotary axes (the d-q axes) on the basis of the currents i2u, i2v, i2w detected by the current detection unit 4 and the rotation position θ detected by the position detection unit 2.

The subtractor 14 subtracts the current command values id*, iq* respectively from the currents i2d, i2q obtained by the coordinate converter 11, and outputs resulting deviations di2d (=id*−i2d), di2q (=iq*−i2q).

The current controller 16 calculates compensation voltage command values V1d_h*, V1q_h* on the two rotary axes (the d-q axes) by performing proportional integral control or proportional (P) control such that di2d (=id*−i2d) and di2q (=iq*−i2q), obtained from the subtractor 14, align with each other at zero.

The adder 17 adds the voltage command values v1d*, v1q* on the two rotary axes (the d-q axes), obtained from the current controller 15, to the voltage command values v1d_h*, v1q_h* on the two rotary axes (the d-q axes), obtained from the current controller 16, and outputs resulting voltage command values V1d'*, V1q'* on the two rotary axes (the d-q axes).

The adder 18 calculates voltage command values V1d'''*, V1q'''* on the two rotary axes (the d-q axes) by adding the voltage command values V1d'*, V1q'* on the two rotary axes (the d-q axes), obtained from the adder 17, to the voltage command values vdF*, vqF* on the two rotary axes (d-q axes), obtained from the basic voltage calculation unit 5a.

The coordinate converter 12 converts the voltage command values V1d'''*, V1q'''* on the two rotary axes (the d-q axes), obtained from the adder 17, into the voltage command values v1u*, v1v*, v1w* of the first windings.

In the second voltage calculation unit 7a, the subtractor 19 subtracts the current command values id*, iq* respectively from the currents i2d, i2q obtained from the coordinate converter 11, and outputs resulting deviations di2d (=id*−i2d), di2q (=iq*−i2q).

The current controller 20 calculates voltage command values v2d*, v2q* on the two rotary axes (the d-q axes) by performing proportional integral control such that di2d (=id*−i2d) and di2q (=iq*−i2q), obtained from the subtractor 19, align with each other at zero.

The adder 21 calculates voltage command values v2d'*, v2q'* on the two rotary axes (the d-q axes) by adding the voltage command values v2d*, v2q* on the two rotary axes (the d-q axes), obtained from the current controller 20, to the voltage command values vdF*, vqF* on the two rotary axes (d-q axes), obtained from the basic voltage calculation unit 5a.

The coordinate converter 22 converts the voltage command values V2d'*, V2q'* on the two rotary axes (the d-q axes), obtained from the adder 21, into the voltage command values v2u*, v2v*, v2w* of the second windings.

Figure 2:
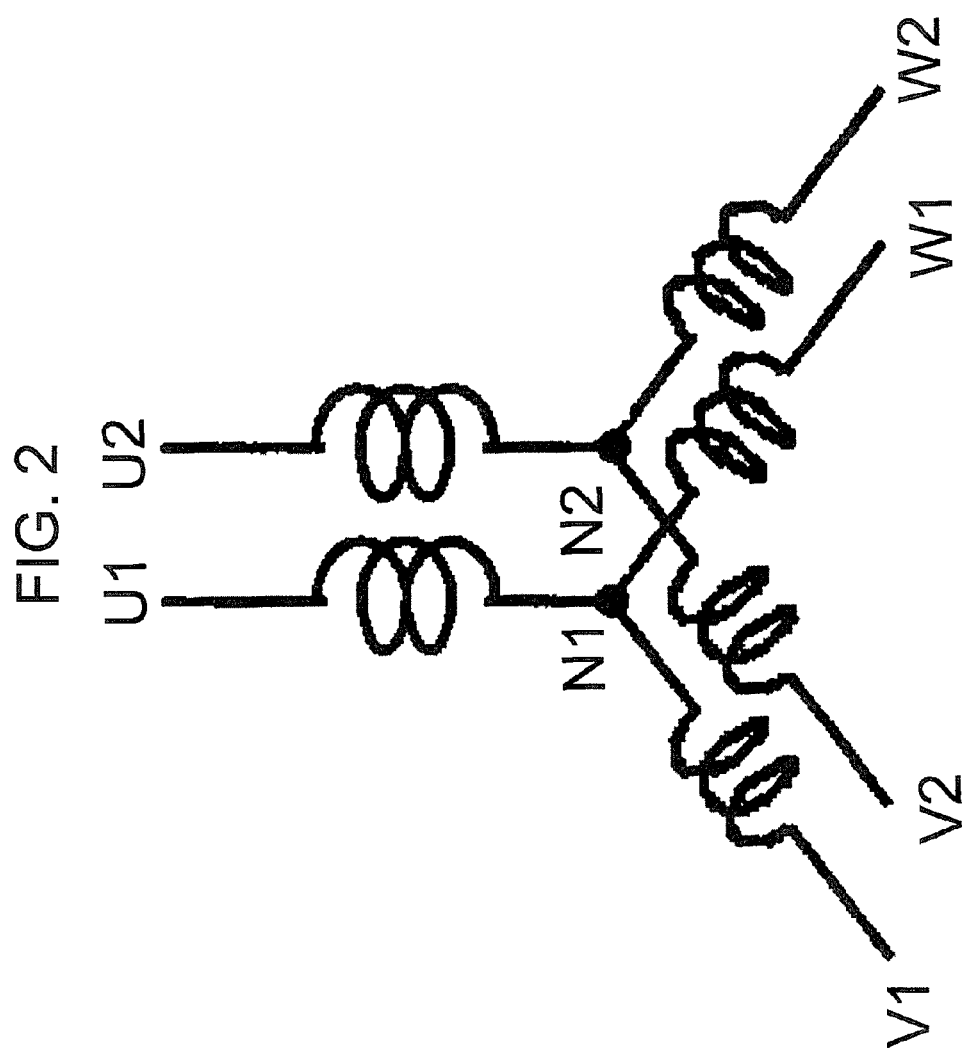
FIG. 2 is a view showing a first winding and a second winding of the AC rotary machine used in this invention.

Next, the AC rotary machine 1a will be described. As shown in FIG. 2, the AC rotary machine 1a is housed in a stator (not shown) of a rotary machine such that a three-phase winding including a set of windings U1, V1, W1 connected at a neutral point N1 and a three-phase winding including a set of windings U2, V2, W2 connected at a neutral point N2 are not electrically connected to each other.

Although the two windings are not electrically connected, the two windings are magnetically coupled by a magnetic circuit formed in the AC rotary machine, and thus the two windings are coupled so as to form precisely a primary side and a secondary side of a transistor.

Figure 3:
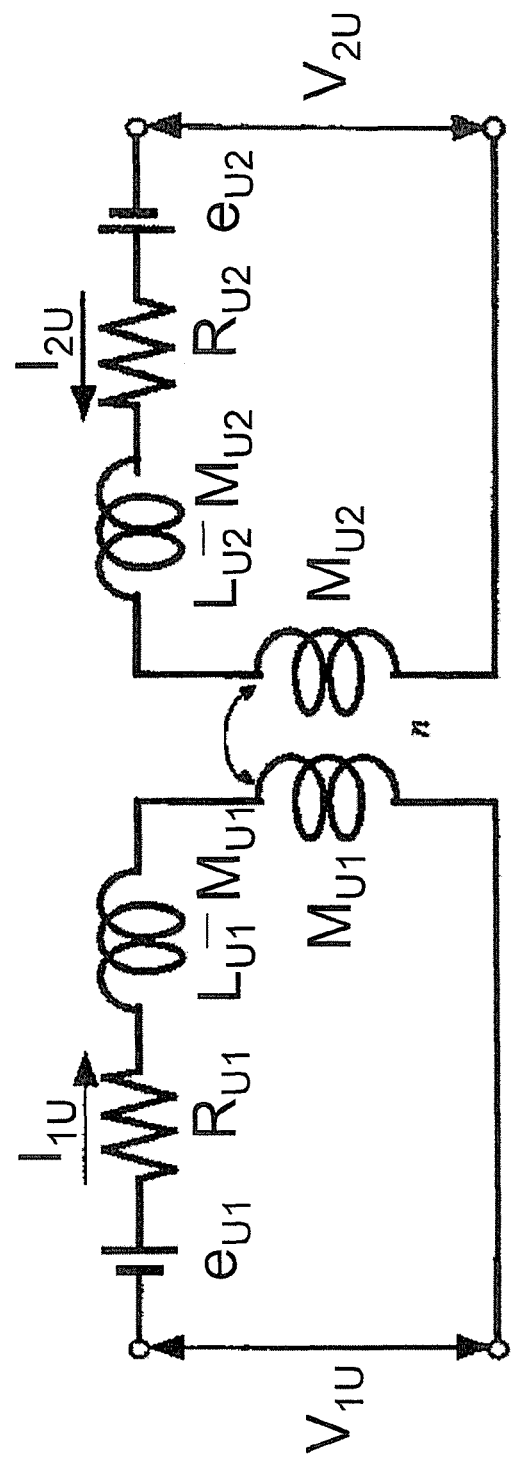
FIG. 3 is an equivalent circuit diagram showing the AC rotary machine having the windings shown in FIG. 2.

Accordingly, an equivalent circuit of the U1 phase and the U2 phase, which are disposed in parallel, can be expressed as shown in FIG. 3. In the drawing, Vu1, Vu2 denote terminal voltages from the respective neutral points, R denotes an armature winding resistance, eu denotes an induced voltage, Mu denotes mutual inductance of the armature winding, and Lu-Mu denotes leakage inductance (self-inductance of armature winding—mutual inductance of armature winding). Further, n denotes a turn ratio in terms of the transistor.

Note that of these values, Lu-Mu and Mu in particular are different to values used to control a motor having a single layer winding, and indicate values between two phases of multiple layers disposed in parallel. Further, in a typical AC rotary machine, parallel windings have an identical number of turns, and therefore n=1. Moreover, at this time, equivalent circuits of the U1 phase and the U2 phase, the V1 phase and the V2 phase, and the W1 phase and the W2 phase are identical, and therefore, in a case where the characteristics of the three phases are equal, even when coordinate conversion is performed on the two rotary axes (the d-q axes) from the U, V, and W phases, an equivalent circuit on the two rotary axes (the d-q axes) is identical to the equivalent circuit shown in FIG. 3.

Figure 4:
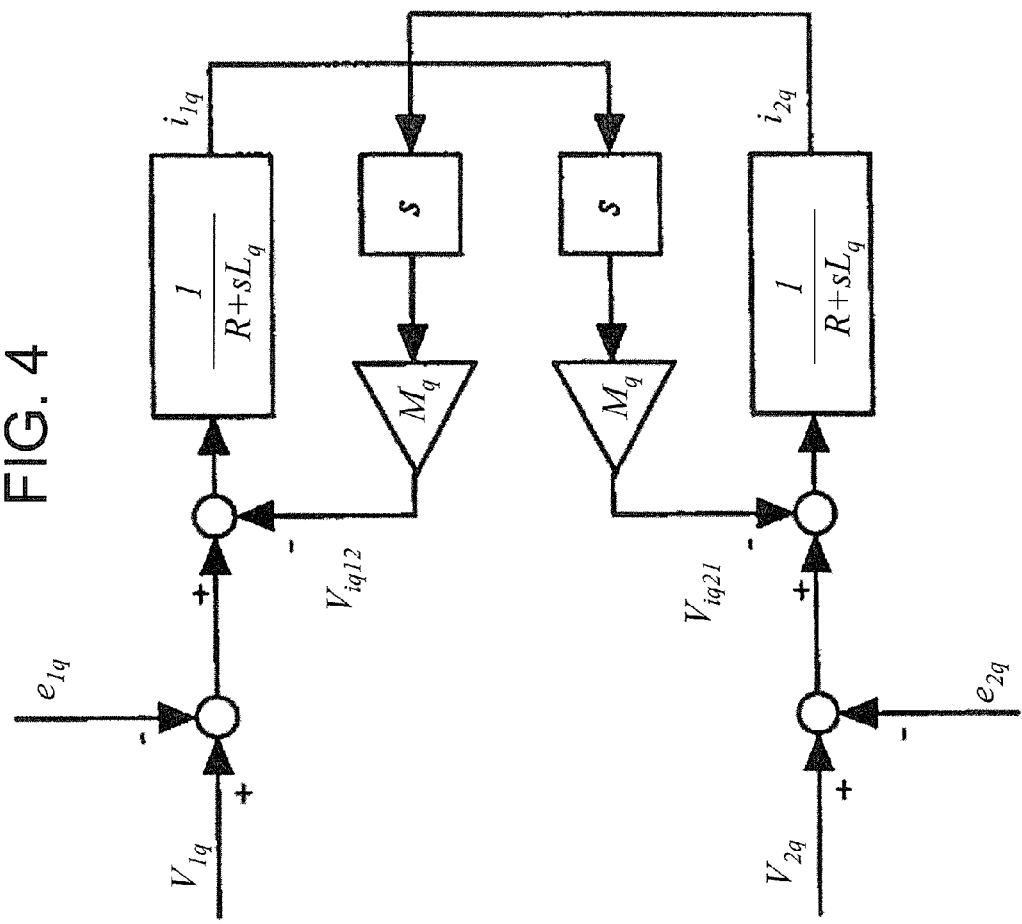
FIG. 4 is a diagram showing the circuit diagram of FIG. 3 as an equivalent circuit of a q axis current.

As described above, the plurality of windings of the AC rotary machine are magnetically coupled, and therefore an interference voltage is generated between the windings. When an equivalent circuit of the AC rotary machine having three phases, namely the U, V, and W phases, is subjected to coordinate conversion on the two rotary axes (the d-q axes), circuit configurations of the respective phases are identical to that of FIG. 3, as described above. FIG. 4, meanwhile, shows an equivalent circuit on the q axis in the form of a block diagram.

In the drawing, V1q, V2q respectively denote q axis winding voltages applied to the first and second winding sets, while i1q, i2q respectively denote q axis winding currents applied to the first and second winding sets. Further, in the drawing, voltages expressed by Viq12, Viq21 indicate interference voltages from the other winding set. Note that s in the drawing denotes a differential operator of a Laplace transform, R denotes a resistance value, Lq denotes a q axis self-inductance, and Mq denotes a q axis mutual inductance.

Figure 5:
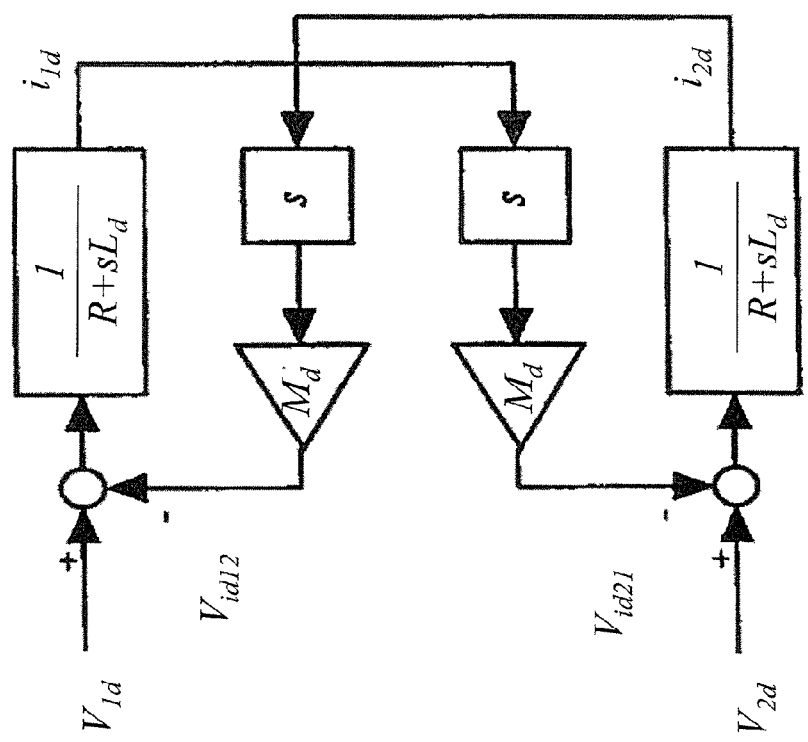
FIG. 5 is a diagram showing the circuit diagram of FIG. 3 as an equivalent circuit of a d axis current.

FIG. 4 shows an equivalent circuit on the q axis of the two rotary axes (the d-q axes), but as shown in FIG. 5, an equivalent circuit on the d axis is configured similarly.

During normal vector control of an AC rotary machine, current control is performed independently on the two rotary axes (the d-q axes), but in an AC rotary machine having a plurality of winding sets, interference voltages act mutually thereon, as described above, and these interference voltages are input into the current control systems as disturbances. As is evident from FIG. 4, the interference voltage is proportionate to a differential value of each winding current, and therefore increases steadily as the current is caused to respond at increasing speed. It is therefore more difficult to improve the response of the current control system than when current control is performed on a single set of windings.

PTL 1 responds to this problem by setting the feedback signal input into the representative current control system at the average value of the output currents of the respective inverters, and setting the feedback signal input into the imbalance suppressing current control system provided on the rotary coordinate system of the AC motor at the differential value of the output currents of the respective inverters. As a result, the imbalance suppressing current control system acts to equalize the output currents of the respective inverters, and therefore the respective currents of the windings of the respective phases in the multiphase AC motor are balanced.

With this configuration, however, calculations must be performed using both the currents of the first windings on the two rotary axes (the d-q axes) and the currents of the second windings on the two rotary axes (the d-q axes) when calculating the average value and the differential value of the currents. Moreover, to implement the operations of the representative current control system and the imbalance suppressing current control system, the voltages of the first windings and the voltages of the second windings must be calculated, and therefore a large number of operations are required.

In contrast to the method of dealing with the interference voltage according to PTL 1, described above, the first embodiment employs a simple configuration in which the voltage command values of the first windings are compensated for on the basis of the currents passing through the second windings.

Returning to FIG. 1, in the first voltage calculation unit 6a, the compensation voltage command values V1d_h*, V1q_h* on the two rotary axes (the d-q axes) are calculated by the current controller 16 on the basis of the currents i2u, i2v, i2w of the second windings.

In the current controller 16, a voltage for compensating for Vid12 in FIG. 5 is output as V1d_h*, and a voltage for compensating for Viq12 in FIG. 4 is output as V1q_h*. By compensating for Vid12 and Viq12, the effect of interference on i1d and i1q is reduced such that i1d and i1q are stabilized. As a result, Vid21, Vid12, which are obtained by multiplying sMd, sMq by i1d and i1q, respectively, are also stabilized, leading to stabilization of i2d, i2q.

According to the first embodiment, therefore, by employing a configuration in which the voltages of the first windings are compensated for (corrected by) the currents of the second windings, which is simple and requires few calculations, a non-interference effect that is at least equal to that of PTL 1 (an improvement in current response that is equal to PTL 1) can be obtained without the need for the complicated current control system configuration of PTL 1.

As described above, however, with a method of improving the current control response by means of non-interference control using detected currents, such as the method of compensating for the voltages of the first windings with the currents of the second windings, as described in PTL 1 and the first embodiment, the interference voltage increases steadily as the currents are caused to respond at increasing speed. A compensation voltage with which to compensate for a large interference voltage is affected by time wastage between detection of the currents and output of the compensation voltage. This effect is particularly evident when using a low-cost microcomputer having a low operation speed, making it difficult to eliminate the effect of interference completely when the current control response is improved.

In response to this problem, PTL 2 discloses an example in which the current response is improved by adding a non-interference voltage, as expressed by [Numeral 1] in PTL 2. With this configuration, however, [Numeral 1] is calculated for each of the control circuits corresponding to the respective windings, and therefore a large number of operations are required. As a result, this configuration cannot easily be packaged in a low-cost microcomputer.

In the first embodiment, on the other hand, the basic voltages vdF*, vqF* on the two rotary axes (d-q axes) are simply calculated by the basic voltage calculation unit 5a on the basis of current command values id*, iq*.

Next, the basic voltage calculation unit 5a will be described.

Equation (1), shown below, is a relational expression indicating a relationship between the voltage and the current on the two rotary axes (d-q axes) in the AC rotary machine 1a. Here, ω denotes an electric angular velocity and φ denotes a flux linkage. Equation (1) is equivalent to an expression that takes into account a speed electromotive force resulting from an armature reaction corresponding to the inductances Ld, Lq, Md, Mq in addition to the relationship between the voltage and the current expressed by the block diagrams shown in FIGS. 4 and 5, described above.

[Numeral 1]

$$\begin{bmatrix} v_{1d} \\ v_{1q} \\ v_{2d} \\ v_{2q} \end{bmatrix} = \begin{bmatrix} R+sL_d & -\omega L_q & sM_d & -\omega M_q \\ \omega L_d & R+sL_q & \omega M_d & sM_q \\ sM_d & -\omega M_q & R+sL_d & -\omega L_q \\ \omega M_d & sM_q & \omega L_d & R+sL_q \end{bmatrix} \begin{bmatrix} i_{1d} \\ i_{1q} \\ i_{2d} \\ i_{2q} \end{bmatrix} + \begin{bmatrix} 0 \\ \omega\phi \\ 0 \\ \omega\phi \end{bmatrix} \quad (1)$$

A process for deriving the basic voltages vdF*, vqF* from Equation (1) will be described below.

The basic voltage calculation unit 5a calculates the basic voltages vdF*, vqF* on the two rotary axes (d-q axes) on the basis of the current command values id*, iq*, and therefore, first, in Equation (1), the currents are given by id*=i1d=i2d, iq*=i1q=i2q (Equation (2)).

[Numeral 2]

$$\begin{bmatrix} v_{1d} \\ v_{1q} \\ v_{2d} \\ v_{2q} \end{bmatrix} = \begin{bmatrix} R+sL_d & -\omega L_q & sM_d & -\omega M_q \\ \omega L_d & R+sL_q & \omega M_d & sM_q \\ sM_d & -\omega M_q & R+sL_d & -\omega L_q \\ \omega M_d & sM_q & \omega L_d & R+sL_q \end{bmatrix} \begin{bmatrix} i_d^* \\ i_q^* \\ i_d^* \\ i_q^* \end{bmatrix} + \begin{bmatrix} 0 \\ \omega\phi \\ 0 \\ \omega\phi \end{bmatrix} \quad (2)$$

Here, the first and third rows and the second and fourth rows on the right side are respectively identical, and therefore Equations (3) and (4), shown below, are obtained.

[Numeral 3]

$$v_{1d}=v_{2d}=\{R+s(L_d+M_d)\}\cdot i_d^* - \omega(L_q+M_q)\cdot i_q^* \quad (3)$$

$$v_{1q}=v_{2q}=\{R+s(L_q+M_q)\}\cdot i_q^* + \omega\{(L_d+M_d)\cdot i_d^*+\varphi\} \quad (4)$$

By calculating the basic voltages vdF*, vqF* on the two rotary axes (d-q axes) as v1d=vdF* in Equation (3) and v1q=vqF* in Equation (4) from the current command values id*, iq* and the relationships in Equations (3) and (4), the required basic voltages vdF*, vqF* are output on the basis of the current command values id*, iq*, and as a result, the response of the AC rotary machine is improved.

Further, a method of calculating the basic voltages in order to improve the current response using even simpler operations than those of Equations (3) and (4) will be described below. In Equations (3) and (4), the electric angular velocity ω is affected by both an inertia moment of the AC rotary machine itself and an inertia moment of a load connected to the AC rotary machine, and therefore responds at a lower speed than the current.

In a comparatively low frequency band such as the electric angular velocity ω, non-interference control based on detected currents such as that described in PTL 1 and this invention, in which the voltage command values of the first windings are compensated for on the basis of the currents passing through the second windings, can be used. However, a frequency band relating to items based on the current command values and the electric constants of the AC rotary machine is equal to a high frequency band in the vicinity of a current control limit, and therefore a current control response can be secured in relation to these items by performing compensation using the basic voltages.

Hence, by omitting the items relating to the electric angle ω in Equations (3) and (4) as in Equations (5) and (6), shown below, the current response can be improved using a simple operation expressed by the current commands and the electric constants (the armature winding resistance R and the armature winding inductances Ld, Lq, Md, Mq) of the AC rotary machine 1a.

[Numeral 4]

$$v_{dF}^*=\{R+s(L_d+M_d)\}\cdot i_d^* \quad (5)$$

$$v_{qF}^*=\{R\pm s(L_q+M_q)\}\cdot i_q^* \quad (6)$$

In the first embodiment of this invention, as described above, by employing a configuration in which the voltage command values of the first windings are compensated for on the basis of the currents passing through the second windings, a current control response band including the band of the electric angular frequency ω is secured without the need for a large number of operations, as in PTL 1. Therefore, in a band where non-interference control based on the detected currents cannot be applied, a current control response can be secured at the level of a single layer winding using the basic voltages calculated on the basis of the current command values and the electric constants.

At this time, non-interference control based on the detected currents can be applied in the band of the electric angular frequency ω, and therefore a response is secured at the level of a single layer winding simply, without the need to include items relating to the electric angular frequency ω, as in PTL 2.

Hence, the current control response can be raised to the level of a single layer winding type AC rotary machine by means of a simple configuration.

Second Embodiment

Figure 6:
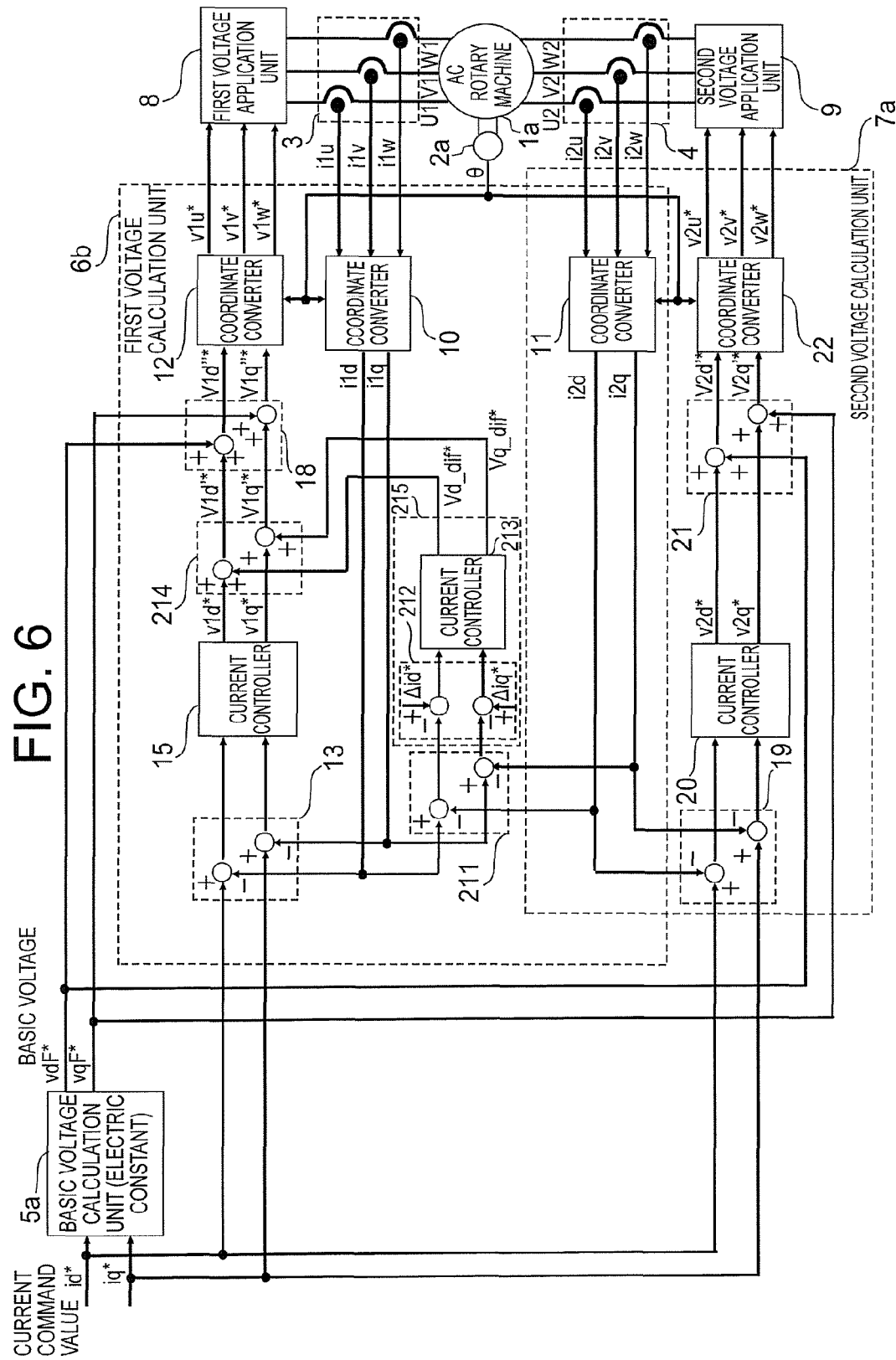
FIG. 6 is a circuit block diagram showing a second embodiment of the control apparatus for an AC rotary machine according to this invention.

FIG. 6 shows a configuration of a second embodiment of the control apparatus for an AC rotary machine according to this invention. In FIG. 6, identical reference symbols to those used in the first embodiment have been allocated to identical or corresponding parts. The second embodiment differs from the first embodiment in having a first voltage calculation unit 6b that includes a differential current calculator 211, a subtractor 212, a current controller 213, an adder 214, and a differential voltage calculation unit 215.

First, the differential current calculator 211 subtracts the currents $i1d$, $i1q$ of the first windings, obtained from the coordinate converter 10, respectively from the currents $i2d$, $i2q$ of the second windings, obtained from the coordinate converter 11, and outputs resulting differential currents $\Delta id$, $\Delta iq$ as differences between the currents of the first windings and the currents of the second windings.

The subtractor 212 subtracts predetermined differential current command values $\Delta id^*$, $\Delta iq^*$ respectively from the currents $\Delta id$, $\Delta iq$ obtained by the differential current calculator 211, and outputs resulting deviations $d\Delta id$ ($=\Delta id^* - \Delta id$), $d\Delta iq$ ($=\Delta iq^* - \Delta iq$). The differential current command values $\Delta id^*$, $\Delta iq^*$ are both set at zero.

The current controller 213 calculates differential voltages $Vd\_dif^*$, $Vq\_dif^*$ by performing proportional integral control or proportional control such that the deviations $d\Delta id$ ($=\Delta id^* - \Delta id$) and $d\Delta iq$ ($=\Delta iq^* - \Delta iq$) obtained from the subtractor 212 both reach zero.

Hence, the differential voltage calculation unit 215 is constituted by the subtractor 212 and the current controller 213, and outputs the differential voltages $Vd\_dif^*$, $Vq\_dif^*$ on the basis of the differential currents $\Delta id$, $\Delta iq$, which serve as the differences between the currents of the first windings and the currents of the second windings, and the differential current command values $\Delta id^*$, $\Delta iq^*$.

The adder 214 calculates voltage command values $V1d'^*$, $V1q'^*$ on the two rotary axes (the d-q axes) by adding the differential voltages $vd\_dif^*$, $vq\_dif^*$ obtained from the current controller 213 respectively to the voltage command values $v1d^*$, $v1q^*$ on the two rotary axes (the d-q axes), obtained from the current controller 15.

By configuring the control apparatus for an AC rotary machine as shown in FIG. 6, the differential currents serving as the differences between the currents of the first windings and the currents of the second windings can be determined by the differential current calculator 211, the deviations between the differential currents and the differential current command values can be determined by the subtractor 212, and differential voltages $v1d\_dif^*$, $v1q\_dif^*$ can be added to the current controller 214 in order to bring the deviations to zero. Hence, the voltage command values $v1d'^*$, $v1q'^*$ of the first windings act to suppress the differential currents, and as a result, the effect of the interference voltage described in the first embodiment can be suppressed.

The manner in which the interference voltage is suppressed by calculating the voltage command values of the first windings on the basis of the differential currents, as described above, will now be described in detail. First, Equations (7) and (8), shown below, are obtained from FIGS. 4 and 5.

[Numeral 5]

$$V_{1d} - V_{2d} = \{R + s(L_d - M_d)\} \cdot (i_{1d} - i_{2d}) \quad (7)$$

$$V_{1q} - V_{2q} = \{R + s(L_q - M_q)\} \cdot (i_{1q} - i_{2q}) \quad (8)$$

Here, $Vid12 = sMdi2d$, $Vid21 = sMdi1d$, $Viq12 = sMdi2q$, and $Viq21 = sMqi1q$.

Figure 7:
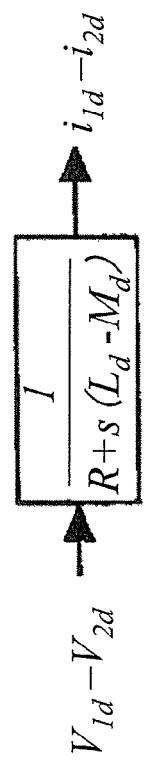
FIG. 7 is a view showing a transmission characteristic from a differential voltage to a differential current on the d axis according to the second embodiment of this invention.
Figure 8:
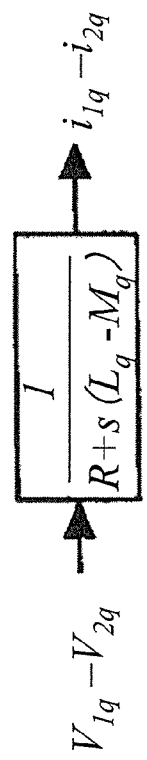
FIG. 8 is a view showing the transmission characteristic from the differential voltage to the differential current on the q axis according to the second embodiment of this invention.

In Equations (7) and (8), a transmission characteristic from the differential voltages ($V1d-V2d$, $V1q-V2q$), which are expressed as differences between first and second voltage groups, to the differential currents ($i1d-i2d$, $i1q-i2q$) is a simple first order lag system, as shown in FIGS. 7 and 8, and therefore an interference voltage such as that shown in FIGS. 4 and 5 does not exist. Hence, by designing the current controller 213 that compensates for the voltage command values of the first windings on the basis of the differential currents as a controller having as a control subject a simple first order lag system such as that shown in FIGS. 7 and 8, the effect of the interference voltage can be reduced, with the result that imbalance between the currents of the first windings and the currents of the second windings can be suppressed.

In the second embodiment, the effect of the interference voltage can be suppressed by correcting the voltage command values of the first windings using the differential voltages $Vd\_dif^*$, $Vq\_dif^*$, obtained from the current controller 213, on the basis of the differential currents, and as a result, an improvement in the current control response can be obtained.

In the second embodiment of this invention, as described above, the differential currents between the currents of the first windings and the currents of the second windings are determined in the first voltage calculation unit, differential voltages are output by the differential voltage calculation unit 215 on the basis of the differential currents and the differential current command values, and the voltage command values of the first windings are corrected on the basis of the output differential voltages. In contrast to the first embodiment, therefore, by designing the current controller 212 so as to have a simple first order lag system from the differential voltage to the differential current as a control subject, imbalance between the currents of the first windings and the currents of the second windings can be suppressed without being affected by an interference voltage.

Further, the second embodiment likewise employs a simple configuration in which the voltage command values of the first windings are corrected on the basis of the differential currents, whereupon the voltage command values of the second windings are calculated on the basis of the current command values and the currents of the second windings. Therefore, a current control response band that includes the band of the electric angular frequency $\omega$ can be secured without the need for a large number of operations, as in PTL 1. Moreover, in the second embodiment, similarly to the first embodiment, there is no need to perform operations including the electric angular frequency $\omega$, as in PTL 2. Furthermore, according to the second embodiment, in a band where non-interference control based on the detected currents cannot be applied, the current control response can be increased to the level of a single layer winding by means of a simple configuration using the basic voltages calculated on the basis of the current command values and the electric constants.

Third Embodiment

Figure 9:
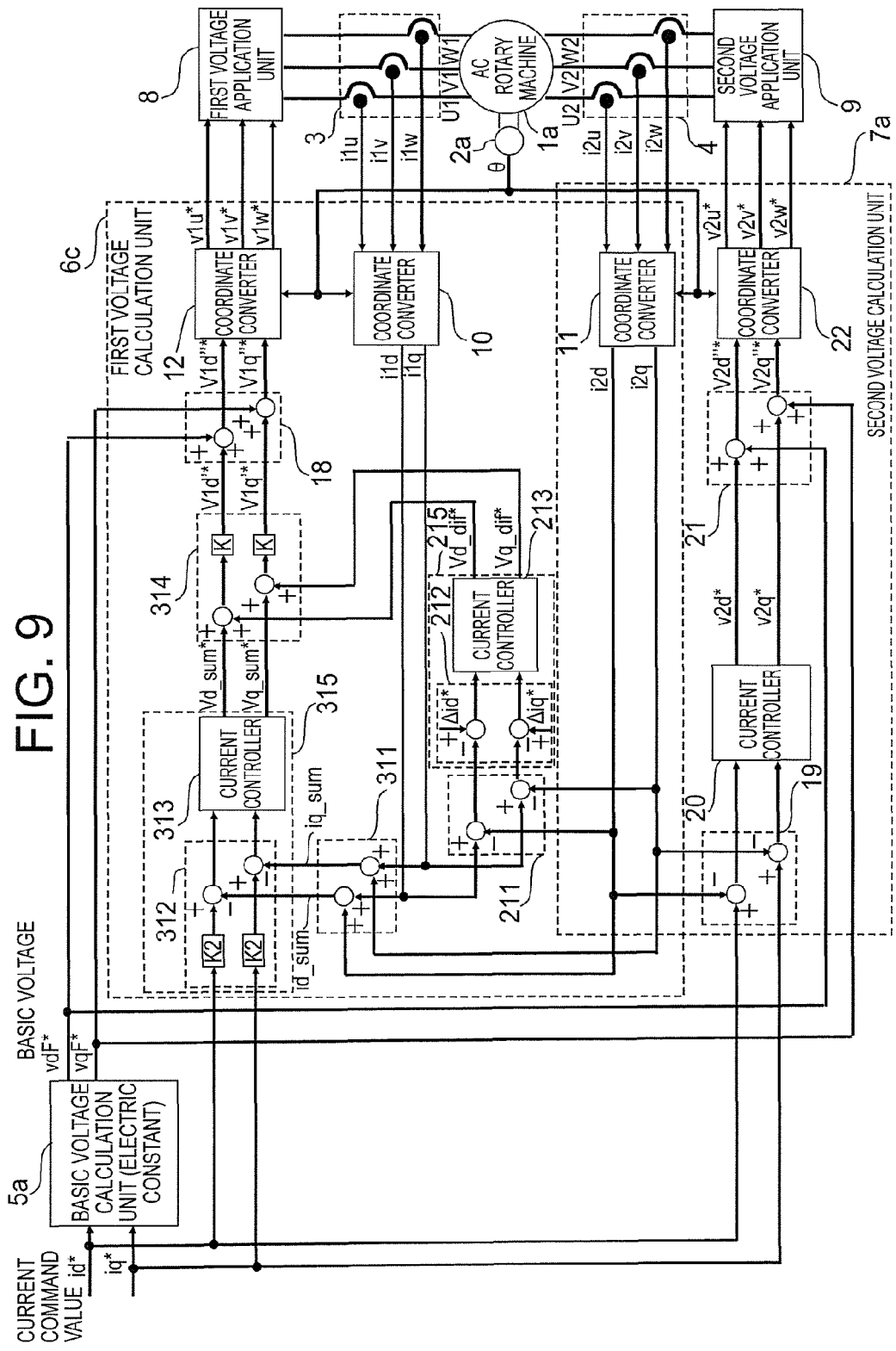
FIG. 9 is a circuit block diagram showing a third embodiment of the control apparatus for an AC rotary machine according to this invention.

FIG. 9 shows a configuration of a third embodiment of the control apparatus for an AC rotary machine according to this invention. In FIG. 9, identical reference symbols to those used in the first and second embodiments have been allocated to identical or corresponding parts. The third embodiment differs from the second embodiment in having a first voltage calculation unit 6c that includes a sum current calculator 311, a subtractor 312, a current controller 313, and an adder 314.

The sum current calculator 311 adds the currents i2d, i2q of the second windings, obtained from the coordinate converter 11, respectively to the currents i1d, i1q of the first windings, obtained from the coordinate converter 10, and outputs sum currents id_sum, iq_sum serving as the sums of the currents of the first windings and the currents of the second windings.

The subtractor 312 subtracts the currents id_sum, iq_sum obtained from the sum current calculator 311 respectively from values obtained by multiplying the current command values id*, iq* by K2, and outputs resulting deviations Δid_sum (=K2×id*−id_sum), Δiq_sum (=K2×iq*−iq_sum). Here, K2 is set at 2 (a constant).

A sum voltage calculation unit 315 is constituted by the subtractor 312 and the current controller 313, and outputs sum voltages Vd_sum*, Vq_sum* on the two rotary axes (the d-q axes) from the current controller 313 on the basis of the sum currents id_sum, iq_sum, which are obtained by the sum current calculator 311 as the sums of the currents of the first windings and the currents of the second windings, and the current command values id*, iq*.

In other words, the current controller 313 calculates the sum voltages Vd_sum*, Vq_sum* on the two rotary axes (the d-q axes) using proportional integral control such that the deviations Δid_sum, Δiq_sum obtained from the subtractor 312 align with each other at zero.

The adder 314 adds the differential voltages Vd_dif*, Vq_dif* obtained from the current controller 213 respectively to the sum voltages Vd_sum*, Vq_sum* obtained from the current controller 313, then multiplies the results by a constant multiple (a multiple of K), and then outputs the results as the voltage command values V1d'*, V1q'* on the two rotary axes (the d-q axes). Here, K is set at 0.5.

By configuring the control apparatus for an AC rotary machine as shown in FIG. 9, the sum currents of the currents of the first windings and the currents of the second windings are determined by the sum current calculator 311, the deviations from the constant (K2) multiples of the sum current command values are determined by the subtractor 312, and sum voltages Vd_sum*, V1q_sum* are calculated by the current controller 313 so as to bring the deviations to zero.

Further, by having the adder 314 calculate the voltage command values V1d'*, V1q'* on the basis of the sum voltages Vd_sum*, V1q_sum* obtained from the current controller 313 and the differential voltages Vd_dif*, Vq_dif* obtained from the current controller 213, the effect of the interference voltage described in the first embodiment can be suppressed. The reason for this will be described below.

Equations (9) and (10), shown below, are obtained from FIGS. 4 and 5.

[Numeral 6]

$$V_{1d}+V_{2d}=\{R+s(L_d+M_d)\}\cdot(i_{1d}+i_{2d}) \quad (9)$$

$$V_{1q}+V_{2q}=\{R+s(L_q+M_q)\}\cdot(i_{1q}+i_{2q}) \quad (10)$$

Here, Vid12=sMdi2d, Vid21=sMdi1d, Viq12=sMdi2q, and Viq21=sMqi1q.

Figure 10:
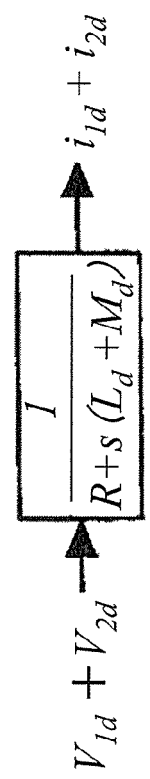
FIG. 10 is a view showing a transmission characteristic from a sum voltage to a sum current on the d axis according to the third embodiment of this invention.
Figure 11:
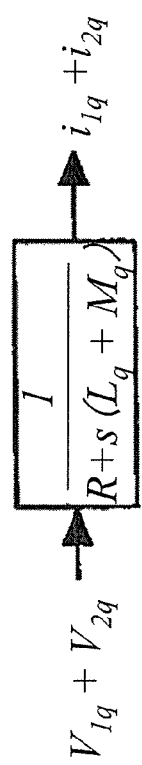
FIG. 11 is a view showing the transmission characteristic from the sum voltage to the sum current on the q axis according to the third embodiment of this invention.

In Equations (9) and (10), a transmission characteristic from the sum voltages (V1d+V2d, V1q+V2q), which are expressed as sums of the first and second voltage groups, to the sum currents (i1d+i2d, i1q+i2q) is a simple first order lag system, as shown in FIGS. 10 and 11, and therefore an interference voltage such as that shown in FIGS. 4 and 5 does not exist. Hence, by configuring the current controller 313 as a current controller that is applied to the control subject shown in FIGS. 10 and 11 so as to calculate the sum voltages Vd_sum*, V1q_sum* on the basis of the sum currents (i1d+i2d, i1q+i2q), the effect of the interference voltage can be suppressed.

Further, the differential voltages Vd_dif*, Vq_dif* are obtained as described in the second embodiment, and therefore the effect of the interference voltage can be suppressed. The adder 314 is configured to calculate the voltage command values V1d'*, V1q'* on the basis of the sum voltages Vd_sum*, V1q_sum* and the differential voltages Vd_dif*, Vq_dif* in which the effect of the interference voltage has been suppressed, and therefore the effect of the interference voltage on the voltage command values V1d'*, V1q'* is small.

Hence, the currents passing through the first windings are stabilized on the basis of V1d'*, V1q'* to an even greater extent than in the first and second embodiments, and as a result, the interference voltages Vid21, Viq21 shown in FIGS. 4 and 5 are also stabilized. Accordingly, the currents of the second windings are likewise stabilized, and therefore the AC rotary machine 1a can be driven with stability.

Note that in the third embodiment, a configuration in which the voltage command values of the first windings are output on the basis of the sum voltages, the differential voltages, and the basic voltages was described, but instead, the voltage command values of the first windings may be output on the basis of the sum voltages, the compensation voltage command values V1d_h*, V1q_h* described in the first embodiment, and the basic voltages. Likewise in this case, the effect of suppressing the interference voltage using the sum voltages is obtained.

In the third embodiment of this invention, as described above, the first voltage calculation unit is configured such that the sum currents of the currents of the first windings and the currents of the second windings are determined by the sum current calculator, the sum voltages are output by the sum voltage calculation unit on the basis of the sum currents and the current command values, and the voltage command values of the first windings are output on the basis of the sum voltages. Therefore, by employing the current controller 313 that outputs the sum voltages on the basis of the sum currents in relation to the simple first order lag system from the sum voltage to the sum current, which serves as the control subject, the effect of the interference voltage can be reduced to a greater extent than in the second embodiment. As a result, imbalance between the currents of the first windings and the currents of the second windings can be suppressed to an even greater extent such that the AC rotary machine can be driven with greater stability.

Moreover, a simple configuration in which the voltages of the first windings are calculated on the basis of the sum currents, the differential currents, and the current command values, and the voltage command values of the second windings are calculated on the basis of the current command values and the currents of the second windings is likewise employed in the third embodiment, and therefore a current control response band that includes the band of the electric angular frequency ω can be secured without the need for a large number of operations, as in PTL 1. Furthermore, according to the third embodiment, in a band where non-interference control based on the detected currents cannot be applied, a current control response is secured at the level of a single layer winding using the basic voltages calculated on the basis of the current command values and the electric constants.

In the third embodiment, at this time, non-interference control based on the detected currents can be applied in the band of the electric angular frequency ω, and therefore a response is secured at the level of a single layer winding simply, without the need to include items relating to the electric angular frequency ω, as in PTL 2. Hence, the current control response can be raised to the level of a single layer winding type AC rotary machine by means of a simpler configuration than that of PTL 2.

Note that here, K2 and K are set respectively at 2 and 0.5 in order to control the sum currents using the sum voltages, but a similar effect is obtained by setting both K2 and K at 1 and controlling an average current using an average voltage.

Fourth Embodiment

Figure 12:
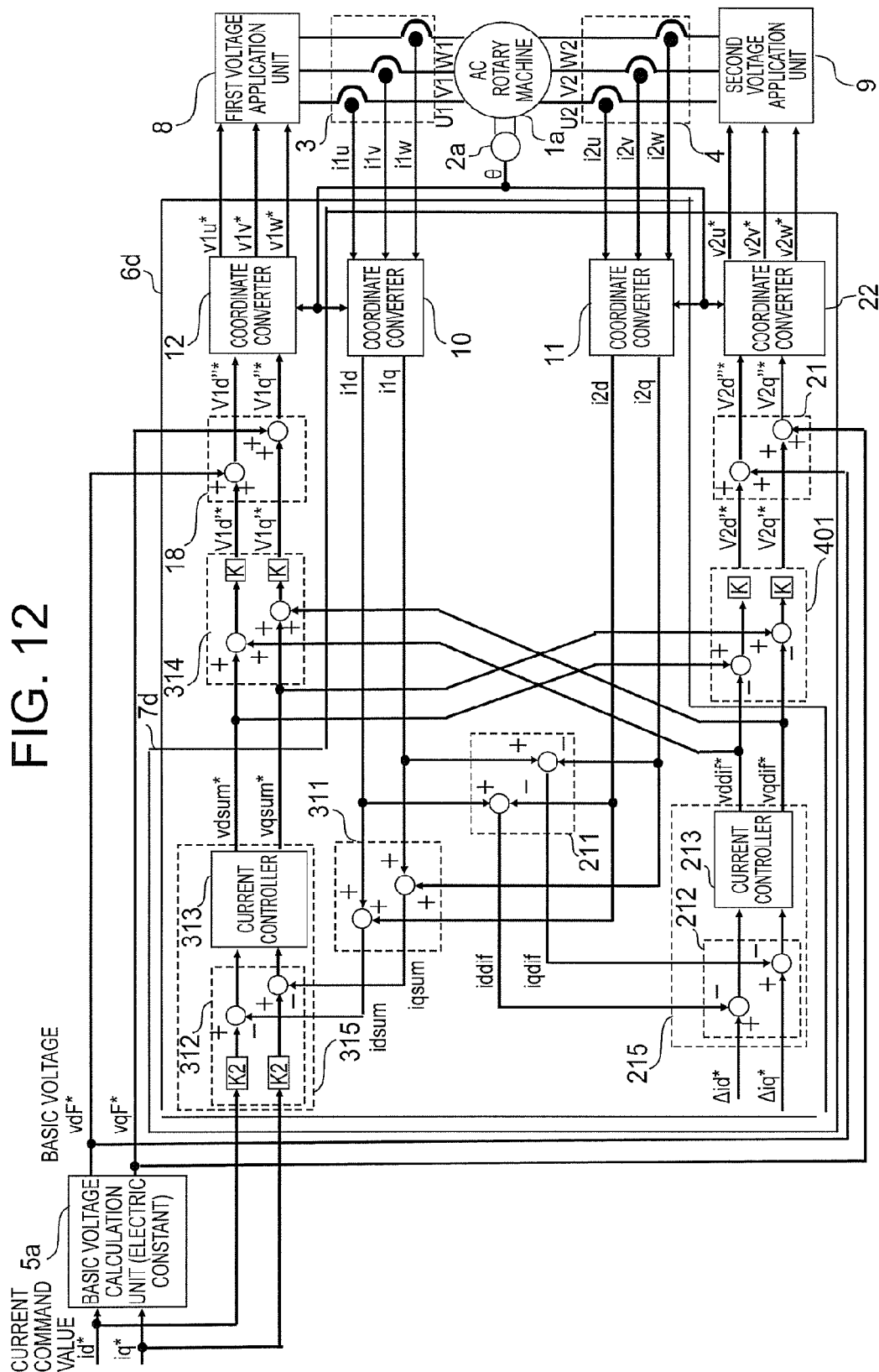
FIG. 12 is a circuit block diagram showing a fourth embodiment of the control apparatus for an AC rotary machine according to this invention.

FIG. 12 shows a configuration of a fourth embodiment of the control apparatus for an AC rotary machine according to this invention. In FIG. 12, identical reference symbols to those used in the first to third embodiments have been allocated to identical or corresponding parts. The parts of the fourth embodiment that differ from the third embodiment are a first voltage calculation unit $6d$, a second voltage calculation unit $7d$, and an adder 401.

The adder 401 subtracts the differential voltages vd_dif*, vq_dif* obtained from the current controller 213 (configured as described above) respectively from the sum voltages vd_sum*, vq_sum* obtained from the current controller 313, then multiplies the results by a constant multiple (a multiple of K), and then outputs the results as the voltage command values V2$d$*, V2$q$* on the two rotary axes (the d-q axes).

By configuring the control apparatus for an AC rotary machine as shown in FIG. 12, the voltage command values V2$d$"*, V2$q$"* of the second windings can be output on the basis of the sum voltages vd_sum*, vq_sum* and the differential voltages vd_dif*, vq_dif*, in which the effect of the interference voltage has been suppressed, in addition to the voltage command values V1$d$"*, V1$q$"* of the first windings.

In the fourth embodiment, therefore, the effect of the interference voltage can be suppressed to a greater extent than in the third embodiment, where only the voltage command values of the first windings are compensated for on the basis of the sum voltages and the differential voltages, and as a result, the current control response can be improved to an even greater extent than in the first to third embodiments.

In the fourth embodiment of this invention, as described above, the first voltage calculation unit and the second voltage calculation unit are configured such that the voltage command values of the first windings and the voltage command values of the second windings are output on the basis of the sum voltages and the differential voltages. Hence, the voltage command values of the first windings and the voltage command values of the second windings are both calculated on the basis of the sum voltages and the differential voltages so that in contrast to the third embodiment, the effect of the interference voltage is also reduced in relation to the voltage command values of the second windings. As a result, imbalance between the currents of the first windings and the currents of the second windings can be suppressed to an even greater extent such that the AC rotary machine can be driven with even greater stability.

Furthermore, in contrast to PTL 1, and similarly to the first to third embodiments, in a band where non-interference control based on the detected currents cannot be applied, a current control response can be secured to the level of a single layer winding using the basic voltages calculated by the basic voltage calculation unit on the basis of the current command values and the electric constants.

At this time, non-interference control based on the detected currents can be applied in the frequency band of the electric angular frequency ω, and therefore a response is secured at the level of a single layer winding simply without the need to include items relating to the electric angular frequency ω, as in PTL 2. Hence, the current control response can be raised to the level of a single layer winding type AC rotary machine by means of a simpler configuration than that of PTL 2.

Fifth Embodiment

Figure 13:
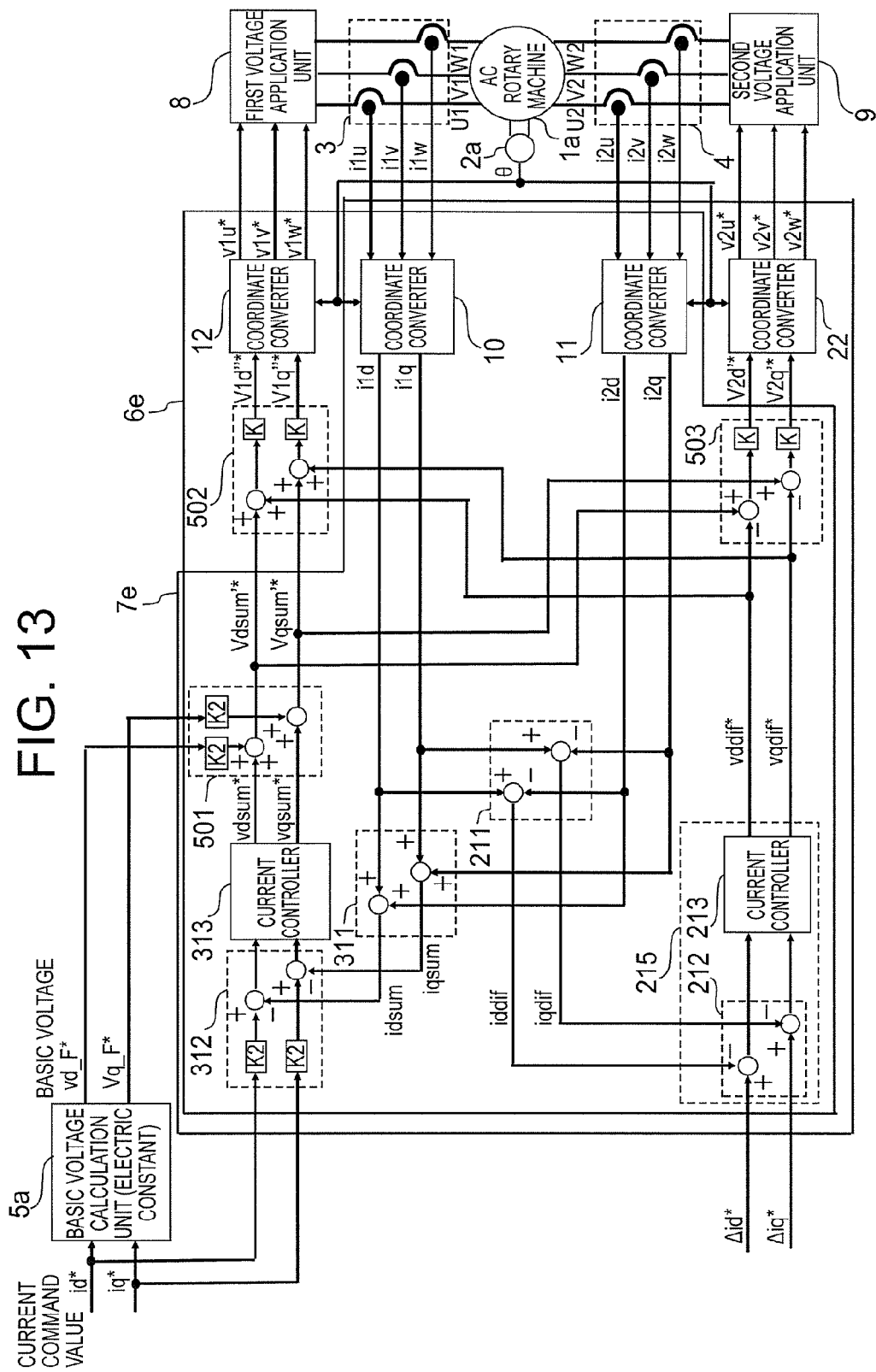
FIG. 13 is a circuit block diagram showing a fifth embodiment of the control apparatus for an AC rotary machine according to this invention.

FIG. 13 shows a configuration of a fifth embodiment of the control apparatus for an AC rotary machine according to this invention. In FIG. 13, identical reference symbols to those used in the first to fourth embodiments have been allocated to identical or corresponding parts. The parts of the fifth embodiment that differ from the first to fourth embodiments are a first voltage calculation unit $6e$, a second voltage calculation unit $7e$, an adder 501, an adder 502, and an adder 503

The adder 501 adds the sum voltages vd_sum*, vq_sum* obtained from the current controller 313 to values K2×vd_F*, K2×vq_F* obtained by multiplying the basic voltages obtained from the basic voltage calculation unit $5a$ by a constant (K2), and outputs the results as added values Vd_sum'*, Vq_sum'*. Here, K2 is set at the same value as that used by the subtractor 312.

The reason for multiplying the basic voltages by K2 is that in the first to fourth embodiments, the basic voltages are added respectively to the voltage command values of the first windings and the voltage command values of the second windings, whereas in this embodiment, the adder 501 outputs the sum voltages Vd_sum'*, Vq_sum'*. Further, the operation for multiplying the basic voltages by K2 may be implemented by the basic voltage calculation unit $5a$ instead of the adder 501.

The adder 502 calculates respective sums of the added values Vd_sum'*, Vq_sum'* obtained from the adder 501 and the differential voltages vd_dif*, vq_dif* obtained from the current controller 213, and then calculates the voltage command values V1$d$"*, V1$q$"* of the first windings on the two rotary axes (the d-q axes) by multiplying the results respectively by a constant multiple (a multiple of K). Here, K is set at the same value as that used by the subtractor 314.

The adder 503 subtracts the differential voltages vd_dif*, vq_dif* obtained from the current controller 213 respectively from the added values Vd_sum'*, Vq_sum'* obtained from the adder 501, and then calculates the voltage command values V2d'*, V2q'* of the second windings on the two rotary axes (the d-q axes) by multiplying the results respectively by a constant multiple (a multiple of K). Here, K is set at the same value as that used by the subtractor 314.

By configuring the control apparatus for an AC rotary machine as shown in FIG. 13, the single adder 501 of this embodiment can be used as the adder for adding the basic voltages, in contrast to the two adders 18, 21 required in the first to fourth embodiments, and therefore the operation can be simplified.

In the fifth embodiment of this invention, as described above, the first voltage calculation unit and the second voltage calculation unit are configured such that added values of the sum voltages and the basic voltages are calculated, whereupon the voltage command values of the first windings and the voltage command values of the second windings are output on the basis of the added values and the differential voltages. Therefore, the single adder 501 can be used as the adder for adding the basic voltages, in contrast to the two adders 18, 21 required in the fourth embodiment, and as a result, the operation can be simplified.

Further, by employing the basic voltages calculated by the basic voltage calculation unit on the basis of the current command values and the electric constants in the frequency band where non-interference control based on the detected currents, such as that described in PTL 1, cannot be applied, a current control response can be secured to the level of a single layer winding.

Furthermore, the basic voltage calculation unit is configured identically to the first to fourth embodiments so that a response at the level of a single layer winding is secured simply without the need to include items relating to the electric angular frequency ω, as in PTL 2.

In contrast to the conventional techniques disclosed in PTL 1 and 2, therefore, the current control response can be raised to the level of a single layer winding type AC rotary machine by means of a simple configuration.

Sixth Embodiment

In the basic voltage calculation unit 5a of the first to fifth embodiments, described above, the basic voltages are calculated on the basis of the current command values and the electric constants, and therefore, when the current command values include a component in a frequency band that equals or exceeds a desired response frequency by which the currents of the first windings and the currents of the second windings respond to the current command values, a component in the frequency band equaling or exceeding the desired frequency is also included in the basic voltages. Therefore, when a voltage is applied to the AC rotary machine 1a on the basis of the basic voltages, the component in the frequency band equaling or exceeding the desired response frequency is also included in the currents of the first windings and the currents of the second windings, and when this band aligns with a frequency band in a range that is audible to humans, for example, noise is generated from the AC rotary machine. The sixth embodiment provides an example for dealing with this problem.

Figure 14:
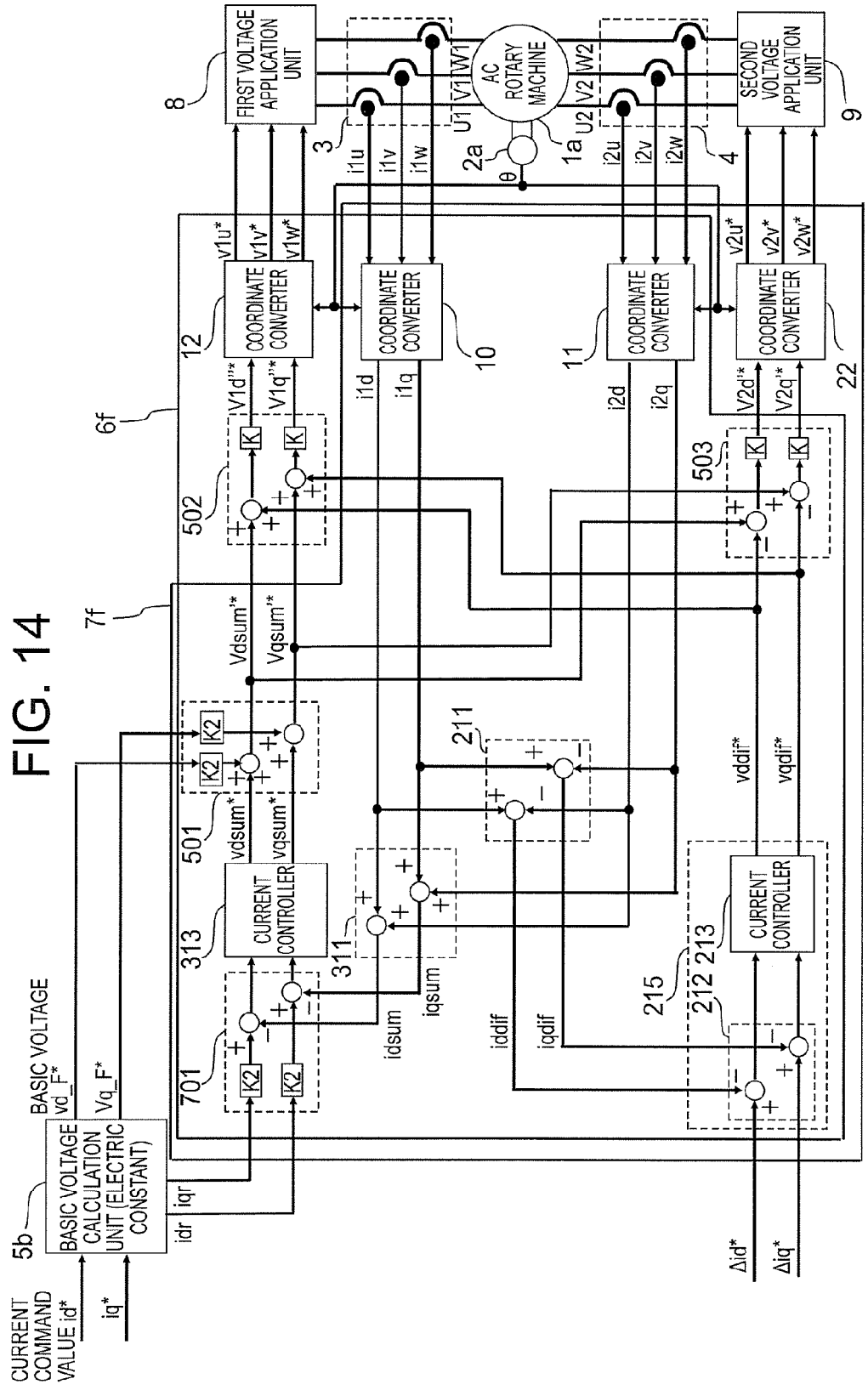
FIG. 14 is a circuit block diagram showing sixth and seventh embodiments of the control apparatus for an AC rotary machine according to this invention.

FIG. 14 shows a configuration of a sixth embodiment of the control apparatus for an AC rotary machine according to this invention. In FIG. 14, identical reference symbols to those used in the first to fifth embodiments have been allocated to identical or corresponding parts. In the first to fifth embodiments, the basic voltages Vdf*, Vqf* are calculated on the basis of the current command values and the electric constants of the AC rotary machine 1a using Equations (5) and (6), whereas in the sixth embodiment, the basic voltages are calculated by the basic voltage calculation unit 5b, described below, using Equations (11) and (12), shown below.

[Numeral 7]

$$v_{dF}^* = \{R + s(L_d + M_d)\} \cdot i_{dr} \tag{11}$$

$$v_{qF}^* = \{R + s(L_q + M_q)\} \cdot i_{qr} \tag{12}$$

Here, idr is a response current issued in response to the d axis current command value id* at a desired time constant of the currents of the first windings and the currents of the second windings relative to the current command values, and iqr is a response current issued in response to the q axis current command value iq* at a desired time constant of the currents of the first windings and the currents of the second windings relative to the current command values. As shown below in Equations (13) and (14), values obtained by implementing filter processing on the current command values are output as the response currents.

[Numeral 8]

$$i_{dr} = \frac{1}{1 + T_{cd} \cdot s} i_d^* \tag{13}$$

$$i_{qr} = \frac{1}{1 + _{cq} \cdot s} i_q^* \tag{14}$$

Here, Tcd is the time constant of the d axis response current, and Tcq is the time constant of the q axis response current.

Equations (13) and (14) constitute a first order low pass filter having time constants that correspond to the desired responses by which the currents of the first windings and the currents of the second windings respond to the current command values. However, the order of the filter is not limited to the first order.

Hence, in the sixth embodiment, response currents having a desired current response to the current command values are output by a response current calculator (not shown) on the basis of the current command values using Equations (13) and (14), whereupon the basic voltages are calculated on the basis of these response currents using Equations (11) and (12).

Next, when Equations (13) and (14) are inserted respectively into Equations (11) and (12), Equations (15) and (16), shown below, are obtained.

[Numeral 9]

$$v_{dF}^* = \frac{R + s(L_d + M_d)}{1 + T_{cd} \cdot s} i_d^* \tag{15}$$

$$= \frac{L_d + M_d}{T_{cd}} i_d^* + \left(R - \frac{L_d + M_d}{T_{cd}}\right) i_{dr}$$

$$v_{qF}^* = \frac{R + s(L_q + M_q)}{1 + T_{cq} \cdot s} i_q^* \tag{16}$$

$$= \frac{L_q + M_q}{T_{cq}} i_q^* + \left(R - \frac{L_q + M_q}{T_{cq}}\right) i_{qr}$$

Hence, the basic voltages vdF*, vqF* may also be calculated using Equations (15) and (16). Furthermore, in the sixth embodiment, an example in which the basic voltage calculation unit of the fifth embodiment is implemented as a basic voltage calculation unit 5b was described, but needless to mention, the basic voltage calculation unit of any of the first to fifth embodiments may be configured as the basic voltage calculation unit 5b.

An effect of configuring the basic voltage calculation unit as the basic voltage calculation unit 5b will now be described. As shown in Equations (13) and (14), frequencies in a frequency band that equals or exceeds the desired responses included in the current command values are removed from the response currents serving as the outputs of the low pass filter having time constants that correspond to the desired responses by which the currents of the first windings and the currents of the second windings respond to the current command values.

By performing operations on the basis of the response currents and the basic voltages using Equations (15) and (16), frequency components equaling or exceeding the desired responses are likewise removed from the basic voltages, and therefore, when currents are passed through the first windings and the second windings of the AC rotary machine 1a on the basis of the basic voltages, frequency components equaling or exceeding the desired responses can be removed from the currents. As a result, noise generated from the AC rotary machine can be reduced.

In the sixth embodiment of this invention, as described above, the desired responses by which the currents of the first windings and the currents of the second windings respond to the current command values are calculated as response currents, and the basic voltages are calculated on the basis of the response currents. In so doing, frequency band components equaling or exceeding the desired responses are removed from the basic voltages such that when currents are passed through the first windings and the second windings of the AC rotary machine on the basis of the basic voltages, frequency components equaling or exceeding the desired responses can be removed from the currents. As a result, noise generated from the AC rotary machine can be reduced in comparison with the first to fifth embodiments.

Moreover, in contrast to PTL 1, in the frequency band where non-interference control based on the detected currents cannot be applied, a current control response can be secured to the level of a single layer winding using the basic voltages calculated by the basic voltage calculation unit on the basis of the response currents and the electric constants. Furthermore, the basic voltage calculation unit can secure a response at the level of a single layer winding simply, without the need to include items relating to the electric angular frequency ω, as in PTL 2.

Further, in PTL 2 (Numerals [1] and [2]), the non-interference voltage is calculated on the basis of a value obtained by multiplying the current command value by an electric constant such as a winding resistance R1 or a self-inductance L1, and therefore, when a frequency component that equals or exceeds the desired response is included in the current command value, this component is included in the non-interference voltage and the currents of the three-phase, duplex winding motor. When this frequency component aligns with an audible range, noise may be generated.

In the sixth embodiment, however, the basic voltages are calculated on the basis of the response currents, as described above, and therefore frequency components equaling or exceeding the desired responses are removed from the basic voltages. As a result, the amount of noise generated by the AC rotary machine can be reduced in comparison with the configuration of PTL 2.

Seventh Embodiment

FIG. 14 is also applied to a configuration of a seventh embodiment of the control apparatus for an AC rotary machine according to this invention. In FIG. 14, identical reference symbols to those used in the first to sixth embodiments have been allocated to identical or corresponding parts.

When the sum voltages are calculated by the current controller 313 on the basis of the current command values, as in the sixth embodiment, and a component in a frequency band that equals or exceeds the desired responses by which the currents of the first windings and the currents of the second windings respond to the current command values is included in the current command values, this component is also included in the sum voltages, although the magnitude thereof varies according to the current response of the current controller 313 to the current command values. Therefore, in a case where the voltage command values of the first windings and the voltage command values of the second windings are calculated on the basis of the sum voltages, whereupon voltages based on these voltage command values are applied to the first windings and the second windings of the AC rotary machine 1a and currents are passed through the first windings and the second windings, frequency components equaling or exceeding the desired responses are included in the currents, and as a result, noise is generated from the AC rotary machine.

Hence, likewise in the seventh embodiment, similarly to the sixth embodiment, a first voltage calculation unit 6f and a second voltage calculation unit 7f input the response currents idr, iqr described above from the basic voltage calculation unit 5b instead of inputting the current command values id*, iq*.

In other words, the basic voltage calculation unit 5b is configured similarly to the basic voltage calculation unit 5a described above, but outputs the response currents idr, iqr calculated by the response current controller (not shown).

A subtractor 701 calculates deviations Δid_sum (=K2×idr−id_sum), Δiq_sum (=K2×iqr−iq_sum) by subtracting the currents id_sum, iq_sum obtained from the sum current calculator 311 respectively from values obtained by multiplying the response currents idr, iqr by K2. Here, K2 is set at 2 (a constant), for example.

An effect obtained by setting the current command values id*, iq* input into the first voltage calculation unit 6f and a second voltage calculation unit 7f at the response currents idr, iqr via the basic voltage calculation unit 5b will be described below.

In response current command values serving as the output of the low pass filter having time constants that correspond to the desired responses by which the currents of the first windings and the currents of the second windings respond to the current command values, frequencies in a frequency band that equals or exceeds the desired responses are removed from the original current command values. Then, by having the subtractor 701 and the current controller 313 calculate the sum voltages on the basis of these response currents, components of the sum voltages in a frequency band that equals or exceeds the desired response are removed.

By performing a compensation operation on the voltage command values of the first windings and the voltage command values of the second windings on the basis of the sum voltages, when currents are passed through the first windings and the second windings of the AC rotary machine 1a, frequency components equaling or exceeding the desired responses are reduced in the currents. Therefore, even when the frequency components align with an audible range, noise generated from the AC rotary machine can be reduced.

In the seventh embodiment, as described above, by setting the current command values input into the first voltage calculation unit and the second voltage calculation unit as the response currents, components in a frequency band equaling or exceeding the desired responses are removed from the sum voltages. Therefore, even when currents are passed through the first windings and the second windings of the AC rotary machine on the basis of the sum voltages, frequency components equaling or exceeding the desired responses are reduced within the currents, and as a result, the amount of noise generated from the AC rotary machine can be reduced in comparison with the first to sixth embodiments.

Moreover, in contrast to PTL 1, in the frequency band where non-interference control based on the detected currents of the AC rotary machine cannot be applied, a current control response can be secured to the level of a single layer winding using the basic voltages calculated by the basic voltage calculation unit on the basis of the response currents and the electric constants.

In addition, in PTL 1, current command values are input as is into current adjusters 17A, 18A such that when a component in a frequency band that equals or exceeds the desired responses exists in the current command values, the same frequency band component is included in a representative voltage command value. Therefore, when a current is passed through the AC motor on the basis of the representative voltage command value, and the band of the frequency band component aligns with an audible frequency, noise may be generated from the AC motor. In this embodiment, however, first voltage command values and second voltage command values are calculated on the basis of the response currents, and therefore a noise reduction effect is obtained.

Moreover, the basic voltage calculation unit is configured identically to the above embodiments, and therefore a response at the level of a single layer winding is secured easily without the need to include items relating to the electric angular frequency ω, as in PTL 2.

Further, in PTL 2 (Numerals [1] and [2]), the non-interference voltage is calculated on the basis of a value obtained by multiplying the current command value by an electric constant such as a winding resistance R1 or a self-inductance L1. Hence, when a frequency component that equals or exceeds the desired response is included in the current command value, this component is included in the non-interference voltage and the currents of the three-phase, duplex winding motor, and as a result, noise may be generated in response to the generated frequency component.

In the seventh embodiment, however, the basic voltages are calculated on the basis of the response currents, as described above, and therefore frequency components equaling or exceeding the desired responses are removed from the basic voltages. As a result, the amount of noise generated by the AC rotary machine can be reduced in comparison with PTL 2.

Eighth Embodiment

Figure 15:
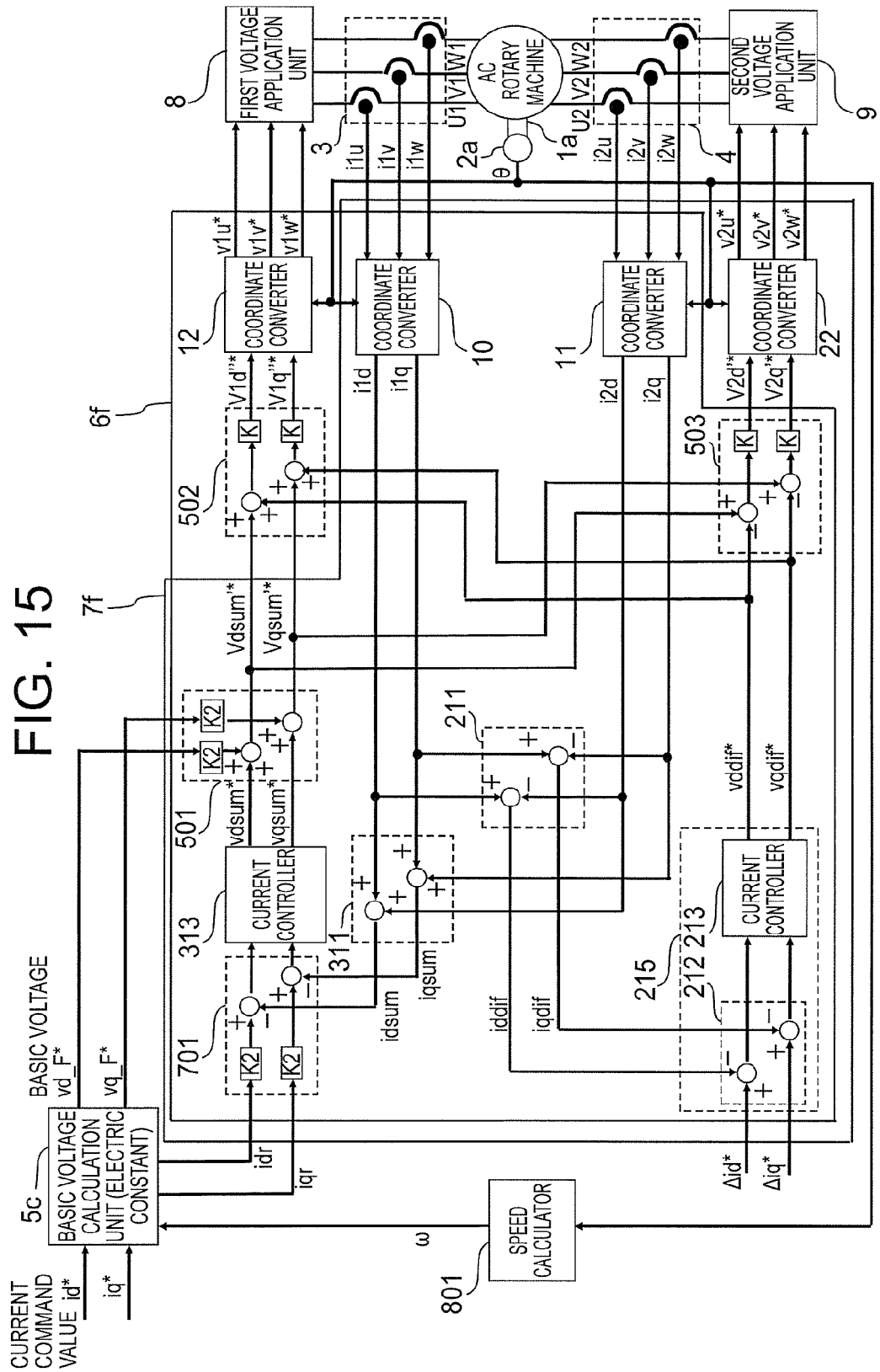
FIG. 15 is a circuit block diagram showing an eighth embodiment of the control apparatus for an AC rotary machine according to this invention.

FIG. 15 shows a configuration of an eighth embodiment of the control apparatus for an AC rotary machine according to this invention. In FIG. 15, identical reference symbols to those used in the first to seventh embodiments have been allocated to identical or corresponding parts. The eighth embodiment differs from the first to seventh embodiments in having a basic voltage calculation unit 5c and a speed calculator 801.

The speed calculator 801 calculates a rotation speed ω of the AC rotary machine 1a by performing a differential operation or a difference operation on the rotation position θ of the AC rotary machine 1a, detected by the position detection unit 2a. The basic voltage calculation unit 5c calculates the basic voltages vdF*, vqF* on the two rotary axes (d-q axes) on the basis of the current command values id*, iq*, the rotation speed ω obtained by the speed calculator 801, and the flux linkage φ serving as an electric constant of the AC rotary machine 1a.

The basic voltage calculation unit 5c will now be described in detail. As described in the first embodiment, the relationships between the current command values and the voltages of the AC rotary machine 1a are expressed by Equations (3) and (4), and therefore, in the basic voltage calculation unit 5d, the basic voltages include items indicating speed electromotive forces that are proportionate to the rotation speed w, as shown below in Equations (17) and (18).

[Numeral 10]

$$V_{dF} = \{R + s(L_d + M_d)\} \cdot i_d^* - \omega(L_q + M_q) \cdot i_q^* \quad (17)$$

$$V_{qF} = \{R + s(L_q + M_q)\} \cdot i_q^* + \omega\{(L_d + M_d) \cdot i_d^* + \varphi\} \quad (18)$$

Here, ω denotes the rotation speed of the AC rotary machine 1a, obtained by the speed calculator 801. Note that the current command values in Equations (17) and (18) may be replaced by the response currents idr, iqr so that the basic voltages are determined from Equations (19) and (20), shown below.

[Numeral 11]

$$V_{dF} = \{R + s(L_d + M_d)\} \cdot i_{dr} - \omega(L_q + M_q) \cdot i_{qr} \quad (19)$$

$$V_{qF} = \{R + s(L_q + M_q)\} \cdot i_{qr} + \omega\{(L_d + M_d) \cdot i_{dr} + \varphi\} \quad (20)$$

Next, an effect obtained by having the basic voltage calculation unit 5c calculate the basic voltages from Equations (17) and (18) or Equations (19) and (20) using the rotation speed ω will be described. In Equations (17) to (20), the basic voltage include the speed electromotive force, and therefore, even in a case where the speed electromotive force (the disturbance voltage) of the AC rotary machine 1a varies rapidly in response to rapid variation in the rotation speed ω, for example, the speed electromotive force item of the basic voltage suppresses the disturbance voltage such that a basic voltage based on the current command value or the response current is obtained.

In the eighth embodiment, as described above, the basic voltage calculation unit 5d is configured to calculate the basic voltage on the basis of the rotation speed and the flux linkage of the AC rotary machine 1a. Hence, in contrast to the respective configurations of the basic voltage calculation units according to the first to seventh embodiments, the basic voltage includes the speed electromotive force item calculated on the basis of the rotation speed and the flux linkage of the AC rotary machine, and therefore, even when the speed electromotive force (the disturbance voltage) of the AC rotary machine varies rapidly in response to rapid variation in the rotation speed of the AC rotary machine, the disturbance voltage can be suppressed. Accordingly, basic voltages corresponding to the current command values or the response currents can be output, and as a result, currents can be output at the desired responses by which the currents of the first windings and the currents of the second windings respond to the current command values.

Moreover, in contrast to PTL 1, in the frequency band where non-interference control based on the detected currents cannot be applied, a current control response can be secured to the level of a single layer winding using the basic voltages calculated by the basic voltage calculation unit on the basis of the current command values or the response currents and the electric constants.

Furthermore, there is no need to provide a non-interference voltage calculation unit for each of the control circuits of the respective windings and to implement the operations of Numerals [1] and [2] in relation to each control circuit, as in PTL 2, and instead, the voltage command values of the first windings and the voltage command values of the second windings can be output on the basis of the basic voltages output from the basic voltage calculation unit. As a result, operations can be simplified.

Ninth Embodiment

Figure 16:
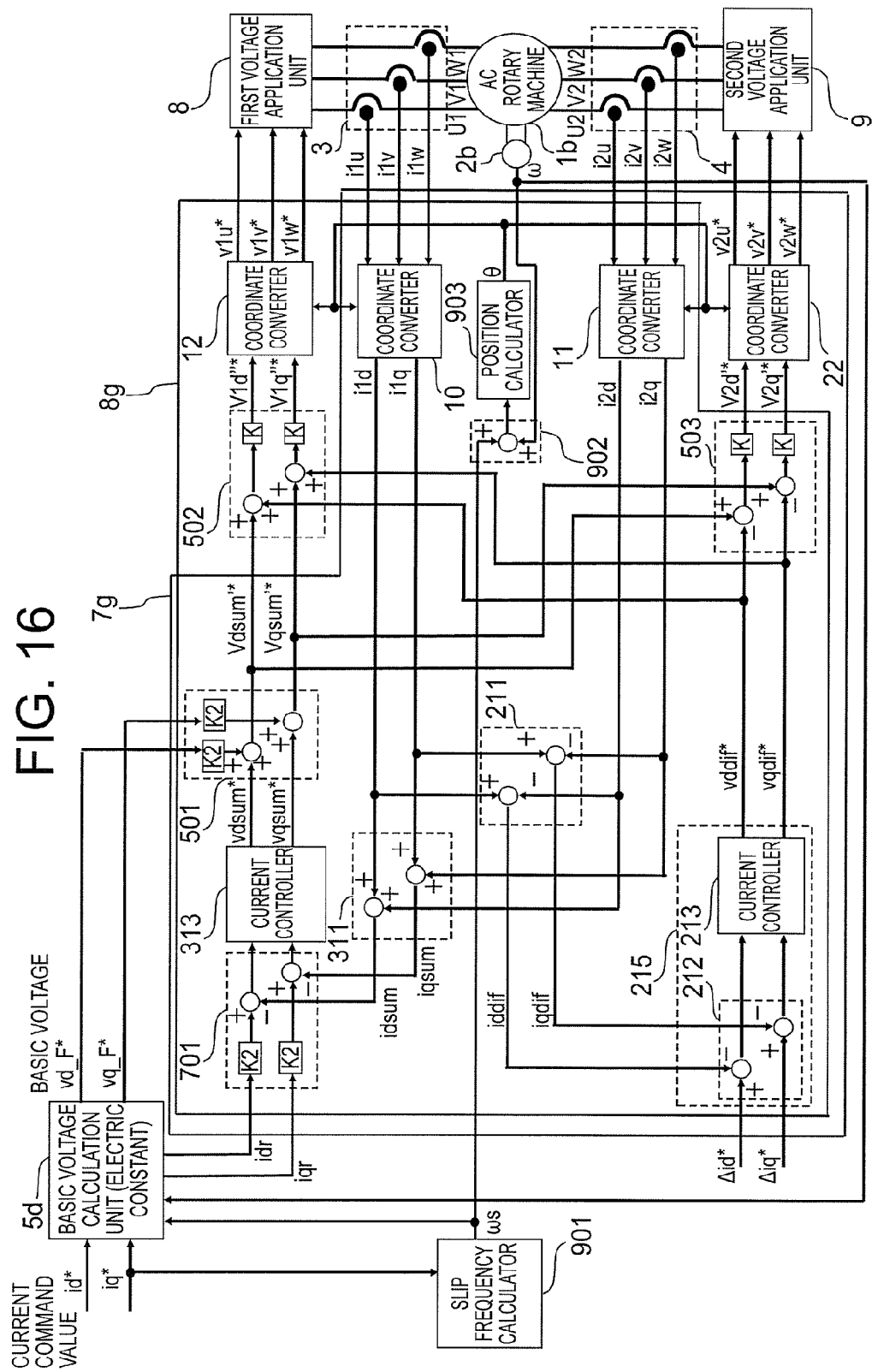
FIG. 16 is a circuit block diagram showing a ninth embodiment of the control apparatus for an AC rotary machine according to this invention.

FIG. 16 shows a configuration of a ninth embodiment of the control apparatus for an AC rotary machine according to this invention. In FIG. 16, identical reference symbols to those used in the first to eighth embodiments have been allocated to identical or corresponding parts. The parts of the ninth embodiment that differ from the first to eighth embodiments are an AC rotary machine 1b, a speed detector 2b, a slip angular velocity calculator 901, the basic voltage calculation unit 5d, and an adder 902 and a position calculator 903 provided in a first voltage calculation unit 6g and a second voltage calculation unit 7g.

Here, the AC rotary machine 1b is an induction rotary machine having two windings. The speed detector 2b detects the rotation speed ω of the AC rotary machine 1b. The slip angular velocity calculator 901 calculates a slip angular velocity ωs at which vector control is established on the basis of the current command value iq*. This calculation method is a well-known technique known as indirect (slip frequency) vector control.

The adder 902 calculates a synchronous angular velocity ω1 by adding the slip angular velocity ωs obtained from the slip angular velocity calculator 901 to the rotation speed ω obtained from the speed detector 2b.

The position detector 903 outputs the position θ of the AC rotary machine 1b by performing an integration operation on the synchronous angular velocity ω1 obtained from the adder 902.

Next, the basic voltage calculation unit 5d will be described in detail. Equation (21), shown below, is a relational expression showing a relationship between a stator voltage and a stator current on the two rotary axes (the d-q axes) in the AC rotary machine 1b. Here, ω1 denotes the synchronous angular velocity, ωs denotes the slip angular velocity, R denotes the armature winding resistance, Ls denotes the armature winding self-inductance, and M12 denotes mutual inductance between the plurality of windings.

[Numeral 12]

$$\begin{bmatrix} v_{1d} \\ v_{1q} \\ v_{2d} \\ v_{2q} \end{bmatrix} = \begin{bmatrix} R+sL_s & -\omega_1 L_s & sM_{12} & -\omega_1 M_{12} \\ \omega_1 L_s & R+sL_s & \omega_1 M_{12} & sM_{12} \\ sM_{12} & -\omega_1 M_{12} & R+sL_s & -\omega_1 L_s \\ \omega_1 M_{12} & sM_{q2} & \omega_1 L_s & R+sL_s \end{bmatrix} \begin{bmatrix} i_{1d} \\ i_{1q} \\ i_{2d} \\ i_{2q} \end{bmatrix} \quad (21)$$

A process for deriving the basic voltages vdF*, vqF* from Equation (21) will be described below.

The basic voltage calculation unit 5d is configured to calculate the basic voltages vdF*, vqF* on the two rotary axes (d-q axes) on the basis of the current command values id*, iq*, and therefore, first, in Equation (1), the currents are given by id*=i1d=i2d, iq*=i1q=i2q, whereby Equation (22), shown below, is obtained.

[Numeral 13]

$$\begin{bmatrix} v_{1d} \\ v_{1q} \\ v_{2d} \\ v_{2q} \end{bmatrix} = \begin{bmatrix} R+sL_s & -\omega_1 L_s & sM_{12} & -\omega_1 M_{12} \\ \omega_1 L_s & R+sL_s & \omega_1 M_{12} & sM_{12} \\ sM_{12} & -\omega_1 M_{12} & R+sL_s & -\omega_1 L_s \\ \omega_1 M_{12} & sM_{q2} & \omega_1 L_s & R+sL_s \end{bmatrix} \begin{bmatrix} i_d^* \\ i_q^* \\ i_d^* \\ i_q^* \end{bmatrix} \quad (22)$$

Here, the first and third rows and the second and fourth rows on the right side are respectively identical, and therefore Equations (23) and (24), shown below, are obtained.

[Numeral 14]

$$v_{1d}=v_{2d}=\{R+s(L_s+M_{12})\}\cdot i_d^* - \omega_1(L_s+M_{12})\cdot i_q^* \quad (23)$$

$$v_{1q}=v_{2q}=\{R+s(L_s+M_{12})\}\cdot i_q^* + \omega_1(L_s+M_{12})\cdot i_d^* \quad (24)$$

Further, a relationship between the synchronous angular velocity ω1, the rotation speed ω of the AC rotary machine 1b, and the slip angular velocity ωs is expressed by Equation (25), shown below.

[Numeral 15]

$$\omega_1 = \omega + \omega_s \quad (25)$$

Hence, in the basic voltage calculation unit 5d, by determining the synchronous angular velocity ω1 from Equation (25) and calculating the basic voltages vdF*, vqF* on the two rotary axes (the d-q axes) as v1d=vdF* in Equation (3) and v1q=vqF* in Equation (4) from Equations (23) and (24) using the current command values id*, iq*, the basic voltages vdF*, vqF* required to pass the current command values id*, iq* are calculated, and as a result, the response of the AC rotary machine is improved.

Further, similarly to the case of the AC rotary machine 1a described in the first embodiment, in Equations (23) and (24), the synchronous angular velocity ω1 is affected by both the inertia moment of the AC rotary machine itself and the inertia moment of the load connected to the AC rotary machine, and therefore responds at a lower speed than the current. In consideration of this fact, items including the synchronous angular velocity ω1 may be omitted from Equations (23) and (24), and instead, operations may be performed using Equations (26) and (27).

[Numeral 16]

$$v_{dF}^* = \{R+s(L_s+M_{12})\}\cdot i_d^* \quad (26)$$

$$v_{qF}^* = \{R+s(L_s+M_{12})\}\cdot i_q^* \quad (27)$$

Moreover, by performing operations in relation to Equations (23), (24), (26), and (27), in which the basic voltages are calculated on the basis of the current command values and the electric constants (R, Ls, M12) of the AC rotary machine 1b, using the response currents, as described in the sixth to eighth embodiments, the basic voltages can be calculated in accordance with the desired responses by which the currents respond to the current command values of the AC rotary machine 1b.

In the ninth embodiment, effects obtained in the first to eighth embodiments in relation to the AC rotary machine 1a can also be applied to the AC rotary machine 1b.

Tenth Embodiment

Figure 17:
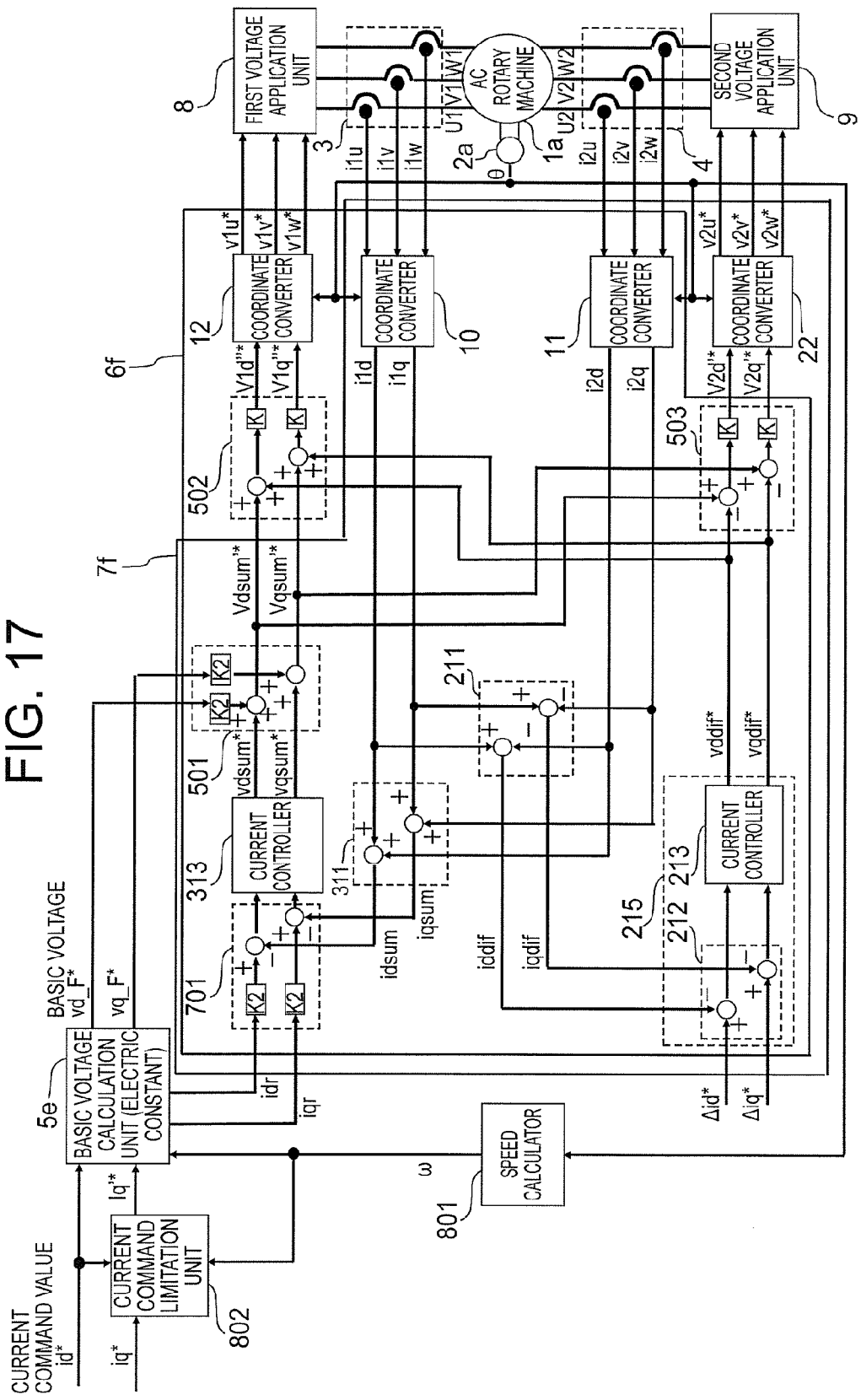
FIG. 17 is a circuit block diagram showing a tenth embodiment of the control apparatus for an AC rotary machine according to this invention.

FIG. 17 shows a configuration of a tenth embodiment of the control apparatus for an AC rotary machine according to this invention. In FIG. 17, identical reference symbols to those used in the first to ninth embodiments have been allocated to identical or corresponding parts.

The tenth embodiment differs from the first to ninth embodiments in that a current command limitation unit 802 is provided. In a high rotation region, an induced voltage is large, and therefore voltage saturation occurs. In this case, response currents such as those of Equations (13) and (14) cannot be obtained. In the tenth embodiment, a feedback defect occurring in the high rotation region when basic voltages vd_F and vq_F become excessively large is prevented by taking into account voltage saturation relative to the current command values serving as the input.

The current command limitation unit 802 will now be described in detail. In the first windings and the second windings, the voltages on the two rotary axes (the d-q axes) must satisfy Equation (28) shown below, in which the power supply voltage is set at vdc.

[Numeral 17]

$$\begin{cases} v_{1d}^2 + v_{1q}^2 \leq \dfrac{v_{dc}^2}{2} \\ v_{2d}^2 + v_{2q}^2 \leq \dfrac{v_{dc}^2}{2} \end{cases} \tag{28}$$

In this case, $v1d$, $v1q$, $v2d$, $v2q$ can be expressed as shown in Equations (3) and (4), and therefore, in a steady state, Equation (29) holds, as shown below.

[Numeral 18]

$$\{R \cdot i_d - \omega(L_q + M_q) \cdot i_q\}^2 + [R \cdot i_q + \omega\{(L_d + M_d) \cdot i_d + \phi\}]^2 \leq \dfrac{v_{dc}^2}{2} \tag{29}$$

When the d axis current id is controlled as commanded, the q axis current iq is limited in accordance with Equation (29). It is possible to calculate iq during voltage saturation by solving Equation (29), but a method that can be realized using a low-cost microcomputer will be described below. Typically, to gain output in the high rotation region, flux weakening control is implemented with the d axis current set at a negative value. In this case, vd takes a negative value, and is therefore limited by Equation (30) shown below, for example.

[Numeral 19]

$$R \cdot i_d^* - \omega(L_q + M_q) \cdot i_q \geq -\dfrac{v_{dc}}{\sqrt{2}} \tag{30}$$

Using Equation (31), shown below, iq* can be limited in a simplified fashion in accordance with the rotation speed ω.

[Numeral 20]

$$\begin{cases} \text{if } \omega > 0 \quad i_q^* \leq \dfrac{R \cdot i_d^* + \dfrac{v_{dc}}{\sqrt{2}}}{\omega(L_q + M_q)} \\ \text{if } \omega < 0 \quad i_q^* \geq \dfrac{R \cdot i_d^* + \dfrac{v_{dc}}{\sqrt{2}}}{\omega(L_q + M_q)} \end{cases} \tag{31}$$

The current command limitation unit 802 calculates a q axis current command value iq'* by limiting the q axis current command value iq* on the basis of id* and ω in accordance with Equation (31).

In the tenth embodiment of this invention, as described above, a limited current command value is set as the input of the basic voltage calculation unit on the basis of the rotation speed and the current command value of the AC rotary machine 1a. In so doing, even when the rotation speed ω increases rapidly such that voltage saturation occurs, the ability to follow the current command value can be improved without the need for a large change in the feedback item obtained by the current controller 313. Moreover, in a region where the rotation speed ω is high, a needless increase in the integration item of the current controller 313 can be prevented, and therefore an improvement in control stability is achieved.

In this embodiment, a current command value to which a limitation is applied by the current command limitation unit 802 is set as the input of the basic voltage calculation unit 5e, but a similar effect can be obtained when the limited current command value is used as the input of the basic voltage calculation units 5a to 5d.

Here, an example in which a current command limit value is calculated on the basis of id* and ω was described, but a similar effect is obtained when a limitation is applied using the voltage command value $v1d''*$ of the first winding, as shown below in Equation (32). A similar effect is also obtained using the voltage command value $v2d''*$ of the second winding or the sum voltage vd_sum'*.

[Numeral 21]

$$\begin{cases} \text{if } \omega > 0 \quad i_q^* \leq \dfrac{R \cdot i_d^* - v_{1d}''^*}{\omega(L_q + M_q)} \\ \text{if } \omega < 0 \quad i_q^* \geq \dfrac{R \cdot i_d^* - v_{1d}''^*}{\omega(L_q + M_q)} \end{cases} \tag{32}$$

In light of the fact that when current control is operating normally, a large difference is not obtained relative to the detected current, a similar effect is also obtained by applying a limitation as shown below in Equation (33) using the detected current of the first winding.

[Numeral 22]

$$\begin{cases} \text{if } \omega > 0 & i_q^* \le i_{q1} - \alpha \\ \text{if } \omega < 0 & i_q^* \ge i_{q1} + \alpha \end{cases} \quad (33)$$

Here, α may be set in consideration of a current detection error and a deviation that occurs in accordance during the current control. Note that a similar effect is also obtained when the detected current of the second winding is used.

The invention claimed is:

1. A control apparatus for an AC rotary machine that includes a first winding and a second winding and performs control operations on two rotary axes, comprising:
a current detection unit that detects a current of the first winding and a current of the second winding, respectively;
a basic voltage calculation unit configured to calculate a basic voltage based on a current command value and an electric constant of the AC rotary machine;
a first voltage calculation unit configured to calculate a first deviation between the current command value and the detected current of the first winding, to calculate a first voltage command value based on the first deviation, to calculate a second deviation between the current command value and the detected current of the second winding, to calculate a compensation voltage command value based on the second deviation, to calculate a compensated voltage command value by adding the compensation voltage command value to the first voltage command value, and to calculate a voltage command value of the first winding by adding the first voltage command value to the basic voltage;
a second voltage calculation unit configured to calculate a second voltage command value based on the second deviation, and to calculate a voltage command value of the second winding by adding the second voltage command value to the basic voltage;
a first voltage application unit configured to apply a voltage to the first winding in correspondence with the voltage command value of the first winding; and
a second voltage application unit configured to apply the voltage to the second winding in correspondence with the voltage command value of the second winding.

2. The control apparatus for an AC rotary machine according to claim 1, wherein the first voltage calculation unit calculates the compensation voltage command value by compensating for the first deviation based on the second deviation.

3. The control apparatus for an AC rotary machine according to claim 1, wherein the first voltage calculation unit calculates a differential current between the current of the first winding and the current of the second winding, and calculates the voltage command value of the first winding by compensating for a deviation between the current of the first winding and the current command value based on the calculated differential current.

4. The control apparatus for an AC rotary machine according to claim 1, wherein the first voltage calculation unit calculates a differential current between the current of the first winding and the current of the second winding, calculates a sum current of the current of the first winding and the current of the second winding, calculates the first deviation as a difference between the sum current and the current command value, and calculates the voltage command value of the first winding by compensating for the calculated difference based on the differential current.

5. The control apparatus for an AC rotary machine according to claim 1, wherein the first voltage calculation unit calculates a differential current between the current of the first winding and the current of the second winding, calculates a sum current of the current of the first winding and the current of the second winding, and calculates a sum voltage based on the sum current and the current command value,
the second voltage calculation unit calculates a differential voltage based on the differential current and a differential current command value,
the first voltage calculation unit calculates the voltage command value of the first winding based on the sum voltage, the differential voltage, and the basic voltage, and
the second voltage calculation unit calculates the voltage command value of the second winding based on the sum voltage, the differential voltage, and the basic voltage.

6. The control apparatus for an AC rotary machine according to claim 5, wherein the first voltage calculation unit calculates the voltage command value of the first winding based on an added value of the sum voltage, the differential voltage, and the basic voltage, and
the second voltage calculation unit calculates the voltage command value of the second winding based on a value obtained by adding the basic voltage to a difference between the differential voltage and the sum voltage.

7. The control apparatus for an AC rotary machine according to claim 5, wherein the first voltage calculation unit calculates the voltage command value of the first winding based on an added value of the sum voltage, the differential voltage, and the basic voltage, and
the second voltage calculation unit calculates the voltage command value of the second winding based on a value obtained by subtracting the differential voltage from the added value.

8. The control apparatus for an AC rotary machine according to claim 1, wherein the basic voltage calculation unit calculates a desired response by which the current of the first winding and the current of the second winding respond to the current command value as a response current, and calculates the basic voltage based on the calculated response current.

9. The control apparatus for an AC rotary machine according to claim 8, wherein the basic voltage calculation unit calculates the response current by implementing filter processing on the current command value.

10. The control apparatus for an AC rotary machine according to claim 8, wherein the basic voltage calculation unit calculates the response current by applying, to the current command value, a low pass filter processing having a time constant that corresponds to a desired response by which the current of the first winding and the current of the second winding respond to the current command value.

11. The control apparatus for an AC rotary machine according to claim 8, wherein the first voltage calculation unit and the second voltage calculation unit use the response current calculated by the basic voltage calculation unit in place of the current command value.

12. The control apparatus for an AC rotary machine according to claim 11, further comprising a speed calculator that detects a rotation speed of the AC rotary machine,
wherein the basic voltage calculation unit calculates the basic voltage and the response current based on the rotation speed and the current command value.

13. The control apparatus for an AC rotary machine according to claim 1, wherein the electric constant includes an armature winding resistance and an armature winding inductance of the AC rotary machine.

14. The control apparatus for an AC rotary machine according to claim 1, wherein the AC rotary machine is a multiplex winding rotary machine, and
the electric constant includes a flux linkage of the multiplex winding rotary machine.

15. The control apparatus for an AC rotary machine according to claim 1, wherein the AC rotary machine is a synchronous rotary machine.

16. The control apparatus for an AC rotary machine according to claim 1, wherein the AC rotary machine is an induction rotary machine,
the control apparatus further comprises a slip velocity calculator that calculates a slip velocity of the AC rotary machine based on the current command value, and
the basic voltage calculation unit calculates the basic voltage based on a rotation speed of the AC rotary machine, the slip velocity, and the current command value.

17. The control apparatus for an AC rotary machine according to claim 15, further comprising a current command limitation unit that applies a limit to one of a plurality of current command values on the two rotary axes.

* * * * *